United States Patent [19]

Turudic et al.

[11] Patent Number: 5,452,306
[45] Date of Patent: Sep. 19, 1995

[54] OUT-OF-BAND EMBEDDED OVERHEAD ARCHITECTURE FOR A TRANSMISSION NETWORK

[75] Inventors: Andy Turudic, Defiance; Samuel Sigarto, Chesterfield, both of Mo.

[73] Assignee: Southwestern Bell Technology Resources, Inc., St. Louis, Mo.

[21] Appl. No.: 117,936

[22] Filed: Sep. 7, 1993

[51] Int. Cl.6 .............................................. H04J 3/12
[52] U.S. Cl. ................................. 370/110.1; 370/112
[58] Field of Search .................. 370/77, 82, 84, 105.1, 370/110.1, 112, 49.5

[56] References Cited

U.S. PATENT DOCUMENTS

| | | | |
|---|---|---|---|
| 4,230,911 | 10/1980 | Fellinger et al. | 370/84 |
| 4,805,171 | 2/1989 | Ewell | 370/110.1 |
| 4,839,893 | 6/1989 | Smith | 370/105.1 |
| 4,914,655 | 4/1990 | Johannes et al. | 370/112 |
| 5,040,170 | 8/1991 | Upp et al. | 359/135 |
| 5,060,229 | 10/1991 | Tyrrell et al. | 370/110.1 |

OTHER PUBLICATIONS

Rockwell International T-1/CEPT (PCM-30) Primer, Document No. 29300N10, Rev. 2, Nov. 1988.
"Synchronous Optical Network (SONET) Transport System: Common Generic Criteria"; Bellcore TR-NW-T-000253; Issue 2; Dec. 1991.
"High-Bit-Rate Digital Subscriber Lines (HDSL)"; Draft Technical Report; TIEI. 4/92-002R2; Jun. 23, 1992.

*Primary Examiner*—Hassan Kizou
*Attorney, Agent, or Firm*—Sandler, Greenblum & Bernstein

[57] ABSTRACT

An interface is disclosed that formats a first link (a source link—e.g., a T1 link) having N channels to fit into a second link (a source link—e.g., a PCM-30 or a doubled T1 link) having N+M channels. Each of the first and second links are implemented with primary rate carrier links, and have a standard payload portion and a standard overhead portion. A mechanism is disclosed for routing information between the first link and the second link, so that information being transported over the first link can also be transported over the second link. An adding mechanism is also disclosed for routing supplemental overhead information to at least one added overhead channel within the second link, wherein the added overhead channel occupies a standard payload portion of the second link. An overhead information bit is disclosed, which transmits information within a (k)th bit of an (l)th channel of each frame of the second link. An information bit signal is formed with at least five consecutive of the (k)th bits. Using the formed information bit signal, information is conveyed regarding the communications link. A path overhead byte is provided for transportation within the added overhead channel of the second link, and includes various overhead bits, including, e.g., the information bit noted above, for performing several maintenance and performance monitoring functions. Four of the bits within the path overhead byte are essentially equivalent to bits within an overhead byte provided for SONET networks.

44 Claims, 13 Drawing Sheets

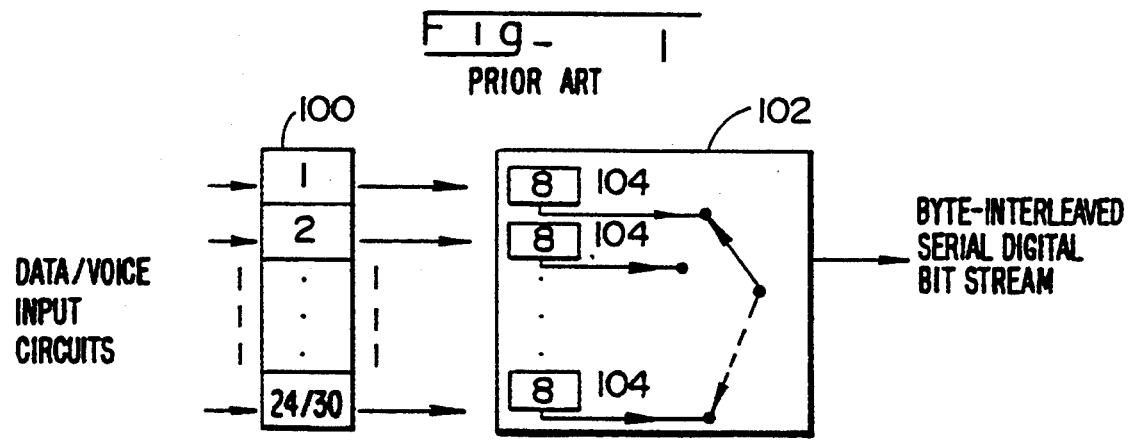
Fig. 1
PRIOR ART
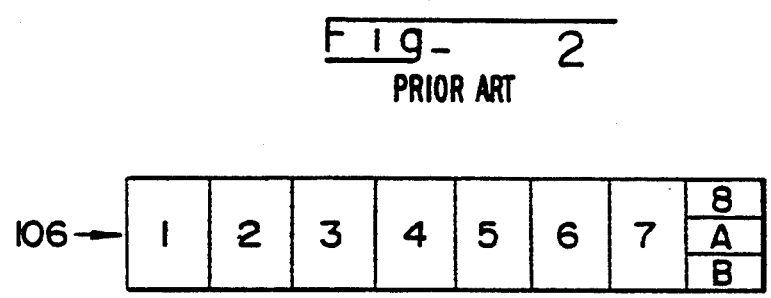
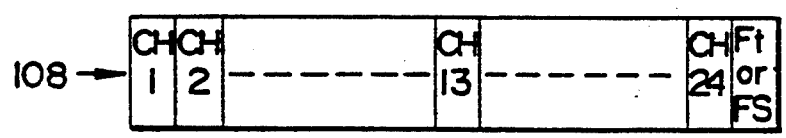
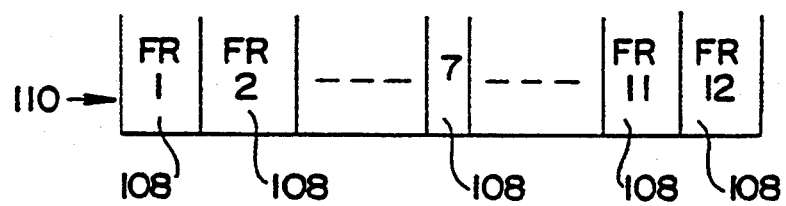
Fig. 2
PRIOR ART

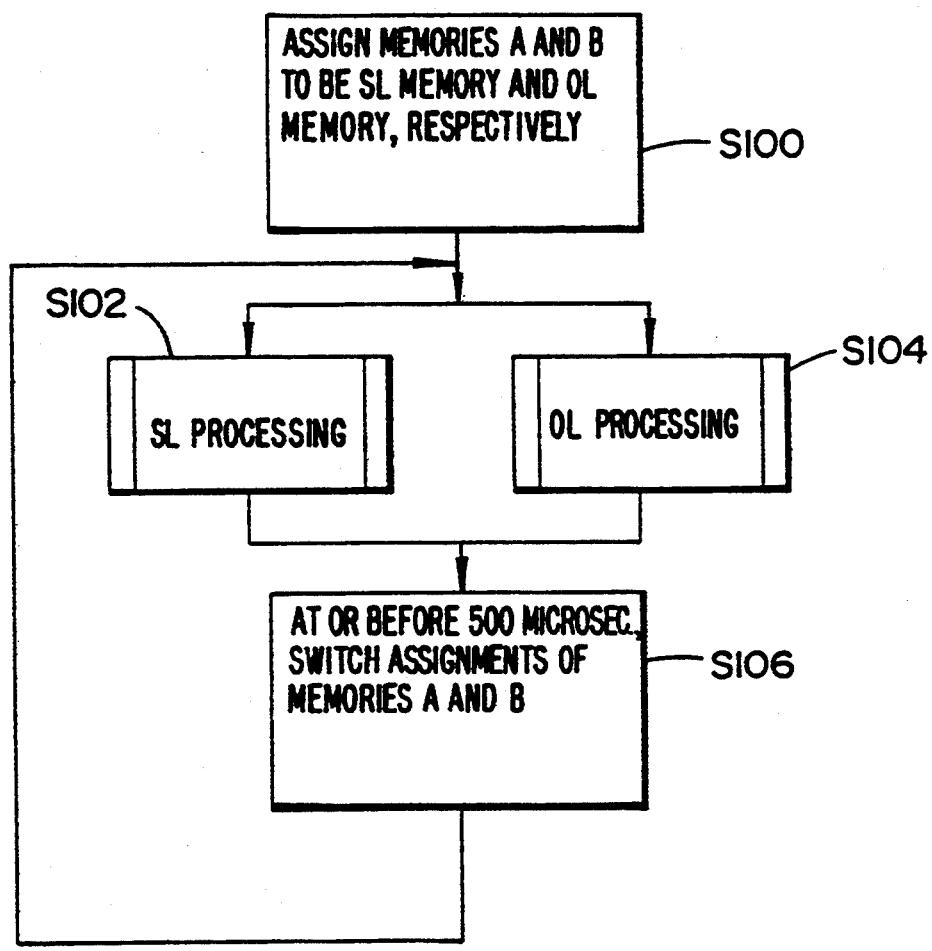

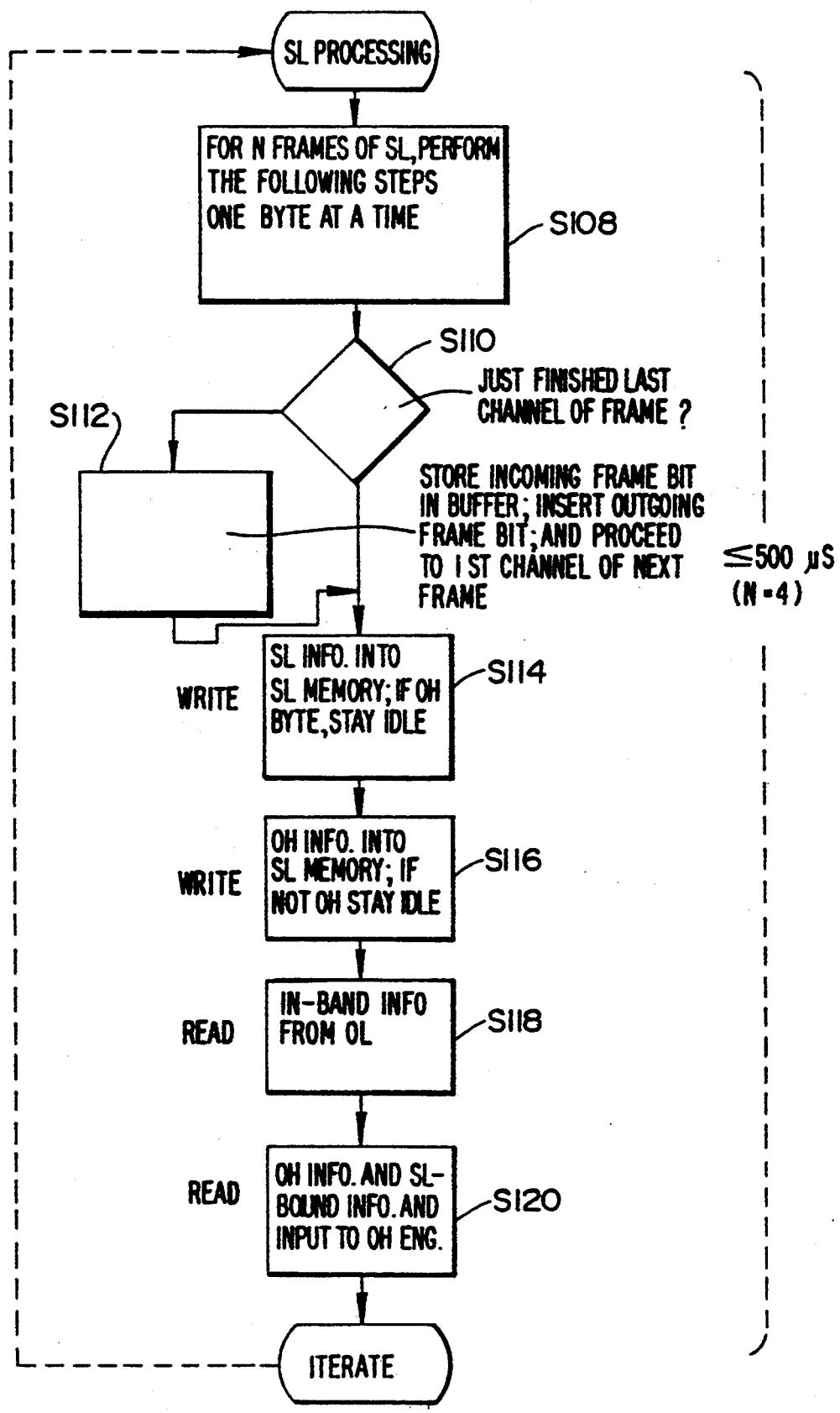

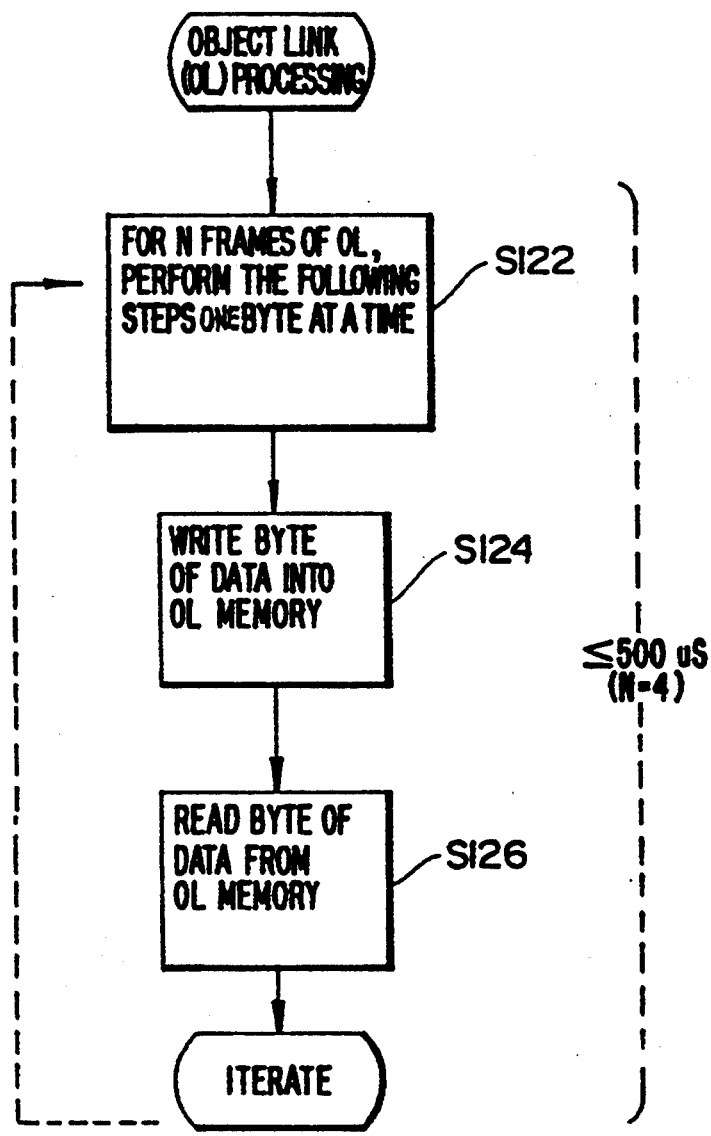

Fig - 12

CHANNEL MAPPING

| | |
|---|---|
| CH00 | A LINK FAS (CCITT FRAME ACQUISITION SEQUENCE) |
| CH01 | ⎤ BEGIN "LOWER 12 CHANNELS" A LINK |
| CH02 | │ |
| CH03 | │ |
| CH04 | │ |
| CH05 | │ |
| CH06 | │ 12 DS0'S, 1/2 T1 |
| CH07 | │ |
| CH08 | │ |
| CH09 | │ |
| CH10 | │ |
| CH11 | │ |
| CH12 | ⎦ |
| CH13 | PATH OVERHEAD A LINK |
| CH14 | NA SIGNALING (11B+D OR 23B+D MODE)/POTS DS-0 A LINK |
| CH15 | CCITT MAS (MULTIFRAM ACQUISITION SEQUENCE) A-LINK ∗ |
| CH16 | B LINK FAS |
| CH17 | ⎤ BEGIN "UPPER 12 CHANNELS" B LINK |
| CH18 | │ |
| CH19 | │ |
| CH20 | │ |
| CH21 | │ |
| CH22 | │ 12 DS0'S, 1/2 T1 |
| CH23 | │ |
| CH24 | │ |
| CH25 | │ |
| CH26 | │ |
| CH27 | │ |
| CH28 | ⎦ |
| CH29 | PATH OVERHEAD B LINK |
| CH30 | NA SIGNALLING (11B+D MODE)/POTS DS-0 B LINK |
| CH31 | CCITT MAS ∗ B LINK |

∗ NOTE - MOST SIG 4 BITS = <u>0000</u>

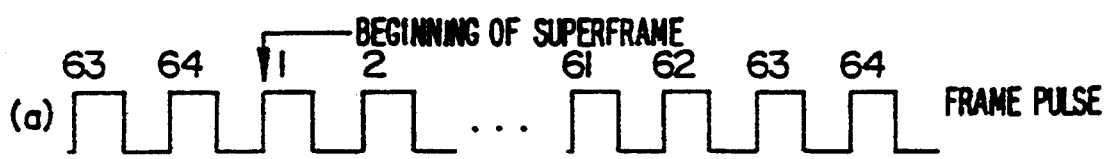

OUT-OF-BAND EMBEDDED OVERHEAD ARCHITECTURE FOR A TRANSMISSION NETWORK

FIELD OF THE INVENTION

The present invention relates to communications systems that utilize time-division-multiplexed transmission links (e.g., T1 and PCM-30 links). More particularly, the present invention is directed to an out-of-band embedded overhead architecture for such data links within a switched telecommunications network.

DISCUSSION OF BACKGROUND INFORMATION

Switched telecommunications networks, such as Local and Wide Area Data and Voice Networks, route transmission information (data and/or voice) over various transmission links connected to Data Terminal Equipments (DTEs). The transmission links transmit electrical signals between DTEs with transmission media such as two-wire open lines, twisted pair lines, coaxial cable, optical fibers, satellite systems, terrestrial microwave links, radial links, and so on.

Switched telecommunications networks may include public carrier networks, private carrier networks, or hybrid combinations of the same. Public carrier networks include networks intended primarily for voice communication, such as PSTN (Public Switch Telephone Network), and networks intended mainly for data communication such as PSDN (Packet-Switched Data Network) and ISDN (Integrated Services Digital Network). Private carrier networks have capabilities similar to those of public carrier networks, but are privately-owned and controlled.

Switched telecommunications networks in North America Europe and Japan utilize multiple channel transmission links, which transmit multiple channels of information in the form of a time-division-multiplexed (TDM) signal. In forming the TDM signal, sets (characters) of digital bits, with each set (character) corresponding to a respective channel of information, are interleaved in time by time-division-multiplexing (TDM); and the interleaved sets of bits are transmitted serially on a common bus which forms the multiple channel transmission link. Such multiple channel transmission links are known as primary rate carrier links. In North America and Japan, T1 primary rate carrier links are used in which 24 information channels are grouped together within each link; in Europe, PCM-30 primary rate carrier links are used in which 30 information channels are grouped together within each link. T1 and PCM-30 primary rate carrier links have aggregate bit rates of 1.544 Mbps and 2.048 Mbps, respectively.

T1 and PCM-30 systems transmit character (byte)interleaved serial digital bit streams, and are used to form transmission links in a switched telecommunications network. A typical switched telecommunications network includes, among several entities, a central office, a remote office, and one or more repeaters. The repeaters are disposed between the central office and the remote office, and regenerate signals passing therethrough, to thereby extend the transmission distance between the central and remote offices.

FIG. 1 illustrates a system for converting several input channels (24 channels with T1, and 30 channels with PCM-30) of channel information into a TDM signal that comprises a byte-interleaved serial digital bit stream. A plurality of coder circuits 100 are provided. Each coder circuit 100 corresponds to a particular channel of transmission information. The output of each coder circuit 100 is connected to a corresponding input of a time division multiplexer 102. Time division multiplexer 102 manipulates transmission information which is input from coder circuits 100, and provides each of a plurality of buffers 104 with a byte of data corresponding to a respective coder circuit 100. Each byte is stored in a buffer 104, and is then assigned a specific time slot within the byte-interleaved serial digital bit stream.

FIG. 2 illustrates a D4 framing structure of a T1 link. As illustrated in FIG. 2, the byte-interleaved serial digital bit stream of a T1/D4 transmission link is arranged in accordance with a framing schedule in which 24 channels 106 (each channel corresponding to a byte) are consecutively arranged in the form of a frame 108. A channel 106 is illustrated in the top portion of FIG. 2, a frame 108 is illustrated in the middle portion of FIG. 2, and a superframe 110, which includes 12 frames, is illustrated in the bottom portion of FIG. 2. The consecutively numbered bits, channels, frames and super frames of the bit stream are transmitted in time from left to right, thus resulting in a direction of transmission as indicated by the arrow at the bottom of FIG. 2.

The first through seventh bits of each channel 106 comprise transmission information, i.e., link payload information. The eighth bit (the least significant bit) of each channel 106 (called a signalling bit) is used either for supervision, or signalling (e.g. to establish a connection, or to terminate a call). The eighth bit of selected channels in every sixth and twelfth frame of superframe 110 contains signalling information. These signalling bits are inserted by "robbing" the eighth bit of each data word of each channel 106, and by replacing the "robbed" eighth bit with a signalling bit. This mechanism is referred to as "robbed bit signalling."

The 193rd bit of each frame is referred to as the multiframe alignment bit or "F" bit. The "F" bit may comprise a bit for terminal framing, designated as Ft, or a bit for multiframe synchronization (used to identify frames 6 and 12), designated as Fs.

FIG. 3 illustrates a CEPT PCM-30 transmission framing format. The first channel 106 (which corresponds to time slot zero) and the seventeenth channel 106 (time slot sixteen) facilitate the transmission of signalling information, such as on hook and off hook, call progress, dialing digits, and so on. For "even" frames, within the sixteen frame multiframe structure (superframe 110), time slot zero is utilized to indicate a frame alignment signal. During the alternate "odd" frames of the superframe 110, time slot zero contains an international Bit I, national bits N (reserved for national use by respective countries), and an alarm indication signal A. Time slots 1–15 and 17–31 are assigned to 30 telephone channels numbered 1 to 30, and all eight bits of each time slot represent transmission information.

As illustrated above, transmission links, such as the T1 and PCM-30 links, must transmit both transmission information (i.e., link payload information) and overhead information. Various enhanced T1 and PCM-30 primary rate carrier systems have been implemented in order to increase the payload bandwidth (i.e., the amount of the link's bandwidth available to the transmission information), and to minimize the extent to which the transmission of network overhead information infringes upon the payload bandwidth.

One form of network overhead information is signalling information, which is used for establishing, maintaining, terminating, and accounting for a circuit-switched connection between two end points. Conventional schemes employ an in-band approach (i.e., an approach that uses channels that contain transmission information) to transmit signalling information within the network; that is, the signalling information runs in-band, and shares the same channel as the transmission information. One in-band approach is the "robbed bit signalling" described above. With such an approach, the user is deprived of a portion of the limited payload bandwidth provided by the transmission link.

In order to address this problem, ISDN includes a D-channel which provides an out-of-band common channel signalling facility. The ISDN D-channel conveys, by means of special messages, signalling information out-of-band, and thus fully utilizes the available payload bandwidth provided by the transmission link.

Accordingly, with ISDN, a primary rate carrier system, e.g., T1, may be enhanced to include special features such as common channel signalling.

Another significant emerging telecommunications protocol is the Synchronous Optical Network (SONET), which is intended to provide a formal framework for fiber-optic transport within wide area networks on a local, national and international basis. Because of the significantly high transmission rates available with the SONET protocol, currently from 1.728 Mbps to 2.48832 Gbps, the SONET protocol has a relative abundance of bandwidth for data transmission. The SONET protocol can thus afford to provide several out-of-band overhead bytes, which facilitate overhead functions including a path trace, to ensure receiver-to-transmitter terminal connection, an error monitoring function, a path status byte, and other useful control and monitoring functions. The out-of-band overhead bytes, together, greatly enhance the network maintenance and signalling aspects of a SONET transmission link.

Accordingly, with SONET, performance monitoring can be performed on a per-frame basis. This provides significant advantages over conventional transmission link protocols that are presently implemented.

A virtual tributary (VT) structure of SONET is defined for transporting lower rate signals such as DS1, DS1C, DS2, and 2.048 Mbps signals. Accordingly, T1 links can be transmitted within a SONET fiber-optic cable of a SONET network (virtual tributary—VT), and thus can gain the benefits of the performance monitoring and embedded signalling that accompanies a SONET system. However, once data leaves the "SONET hardware" of the VT, monitoring and other out-of-band information that accompanies the SONET system is terminated. Thus, once the information goes beyond a specific point, and enters the NON-SONET (typically copper-based) T1 system, it is difficult to ascertain the performance of the system, with the same real-time (per-frame) accuracy as with a SONET system.

For out-of-band transmission of overhead information within T1 links, an extended framing format has been utilized. Several frames are transmitted in order to convey out-of-band overhead information, such as information indicative of the integrity of data being transmitted by the link. For example, with the Extended Superframe Format (ESF or Fe), in order to perform a cyclic redundancy check, a 24 frame superframe must be transmitted in order to convey six bits of information to represent the error performance of the link. While the six bit CRC (Cyclic Redundancy Check) can detect errors that occur on a DS1 signal, and can be used in applications to provide end-to-end performance monitoring, such information can only be obtained after waiting for the passage of 24 frames.

A delay is encountered in obtaining the error detection information, due to the limited bandwidth that is available to the overhead information. The ESF T1 link is unable to obtain performance information on a real-time (i.e., per-frame) basis, which can be disadvantageous. For example, one cannot individually ascertain the integrity or accuracy of each individual frame. Thus, should a short spurt of noise occur within one or two frames in a bit stream, the noise would go undetected, but nonetheless would affect the data within that frame, or group of frames. This significantly limits the ability to maintain and/or verify the integrity of the system. In addition, data indicative of the performance of the system, such as the bit error rate, can only be obtained with the use of statistical methods. On the other hand, if this information could be acquired on a per-frame basis, an accurate bit error rate (per-frame) could be provided.

The limitations in performance monitoring of links such as DS1/D4 and ESF are even more significant when troubleshooting problems with the transport of packet data. For example, with an ESF T1 link, an error check is performed across a complete superframe. If a transmission error occurs within a particular packet, the error detection technique utilized by an ESF link would be unable to localize the problem error, and any action taken to correct a detected error would affect the whole superframe.

The need for an ability to accurately monitor (in time and place) the performance of a telecommunications link is becoming increasingly significant with the integration of multiple telecommunications networks. For example, in recent years, computer-controlled private branch exchanges (PBXs) have been developed, and have been integrated with public carrier networks, to form hybrid networks. It is thus increasingly important to afford parties individually responsible for each network, within a hybrid internetwork, the ability to isolate where a problem has occurred. With this ability to isolate problems, the party responsible for correcting the problems can be accurately identified.

Several telecommunications protocols, such as those described above, transmit channels of data in the form of a character-interleaved serial digital bit stream. Such telecommunications protocols transmit overhead information regarding network maintenance and signalling. Network, maintenance, and signalling information are transmitted in accordance with a channel and/or bit arrangement scheme to implement such functions as diagnostics (e.g., loopback), performance monitoring, embedded signalling, and ancillary communication links.

Various protocols, such as SONET and ISDN, have been brought forth which increase or maintain the payload bandwidth (i.e., the bandwidth available for transport of transmission information), and provide transmission link resources (i.e., channels, frames, bits) for transporting overhead information. However, implementation of such protocols presently requires the use of special hardware in addition to, or instead of, the standard hardware being utilized for primary rate carrier systems such as T1 and PCM-30.

TERMS AND ACRONYMS

For purposes of clarification, and to assist readers in understanding the description given herein, a number of terms and acronyms are defined as follows:

- CEPT A TDM Communications Link (equivalent to a PCM-30 link)
- DS0 Digital Signal Rate Zero
- DTE Data Terminal Equipment
- DTMF/DP Dual Tone Multi-Frequency/Dial Pulse
- FAS Frame Acquisition Sequence
- HDSL High-Rate Digital Subscriber Line
- MAS Multiframe Acquisition Sequence
- MUX Multiplexer
- NA North American Signalling
- ODIM Overhead Drop/Insert Multiplexer
- PCM-30 A CCITT TDM Primary Rate Carrier Communications Link (w/32 channels)
- POTS Plain Old Telephone System
- PSDN Public Switched Data Network
- PSTN Public Switched Telephone Network
- SONET Synchronous Optical Network
- SONET VT SONET Virtual Tributary
- TDM Time Division Multiplexing,
- T1 A TDM Primary Rate Carrier Communications Link (w/24 channels)
- 23 B+D, 11B+D ISDN T1 Frame Structures

Primary Rate Carrier Link

A TDM Transmission Link Having a Transmission Rate and information transmission encoding scheme that is compatible with hardware and interfacing systems being widely used on either a national or international basis. PCM-30 and T1 links are primary rate carrier links.

Transmission Information

Transmission Information is the payload information of a transmission link. Other information, such as overhead information, signalling information, and other types of "housekeeping" information, do not comprise channel information, but are ancillary thereto.

Switched Telecommunications Network

An assemblage of telecommunications stations, lines, and channels, and switching arrangements for their interconnection.

SUMMARY OF THE INVENTION

In view of the above, the present invention, through one or more of its various aspects and/or embodiments, is thus presented to bring about one or more objects and advantages, such as those noted below.

It is an object of the present invention to provide a system and a method which enhance existing link protocols, e.g., T1 or PCM-30, by adding out-of-band overhead transmission capabilities to the link protocols. In this regard, one particular object of the present invention is to provide a primary rate carrier link, e.g., a T1 or PCM-30 link, with new enhanced logically out-of-band overhead (i.e., "housekeeping") functions. One example of enhancing the overhead capabilities of an existing link protocol, is to extend the overhead capabilities of a SONET VT to a lower bandwidth non-SONET system, such as a copper-based T1 or PCM-30.

It is a further object of the present invention to provide one or more mechanisms for transmitting a significant amount of non-payload information (e.g., overhead and housekeeping information) within a character-interleaved serial digital bit stream. Another object is to transmit such non-payload information out-of-band, but within a channel of a primary rate carrier link.

Several other objects of the present invention are contemplated, such as reducing maintenance costs associated with T1 links. In this regard, it is an object to increase the information that can be utilized for monitoring of the performance of links, maintenance, error detection, and so on. In addition, an object is to improve the quality of signals transmitted by a link, e.g., by allowing one to detect end-to-end faults before user perception thereof.

It is a further object of the present invention to provide an end-to-end solution of monitoring and maintenance capabilities to existing communications links, such as T1 links, that is compatible with available network equipment.

It is a further object of the present invention to provide a transmission protocol that facilitates several versatile out-of-band overhead capabilities, such as ISDN-like signalling capabilities.

It is a further object of the present invention to provide a TDM link with an improved loopback mechanism and with an out-of-band messaging link having enhanced features.

In view of the above background information and objects, the present invention is directed to an interface for formatting a first link having N channels to fit into a second link having N+M channels. The first link transmits first information, and each of the first and second links includes at least one standard primary rate carrier link having a standard payload portion that normally transmits payload information, and a standard overhead portion that normally transmits overhead information. A mechanism is provided for routing the first information to a set of N of the N+M channels of the second link. A mechanism is also provided for routing supplemental overhead information to at least one added overhead channel chosen from the remaining M channels of the second link. The at least one added overhead channel occupies a standard payload portion of the at least one standard primary rate carrier link. The first and second links may comprise time-division-multiplexed links, and may transmit information in the form of a character-interleaved serial digital bit stream. The first link may comprise a T1 link, and the second link may comprise a PCM-30 link, in which case N will be 24 and M will be 8. In addition, the first link may comprise a T1 link, and the second link may comprise two T1 links, in which case N will be 24 and M will be 24.

In accordance with a particular aspect, the standard payload portion, that is occupied by the at least one added overhead channel, comprises channels 1–15 and 17–30 out of 32 channels, numbered 0–31, of a PCM-30 link. In accordance with a further aspect of the invention, the at least one added overhead channel, which carries supplemental overhead information, comprises an out-of-band channel, which does not comprise payload information. A portion of the supplemental overhead information may be arranged so as to be compatible with at least one overhead bit of a SONET link.

The second link may include a mechanism for transmitting a first sub-link and a second sub-link, wherein each of the first and second sub-links comprises a fraction of the N channels of the first link. In this regard, the interface may further include a mechanism for generating the supplemental overhead information so that it comprises signalling bits for controlling the routing of each of the first and second sub-links over the second link. The supplemental overhead information may further include at least one frame acquisition bit.

In accordance with a particular aspect of the invention, a system is provided which comprises the above-described interface for formatting a first link having N channels to fit into a second link having N+M channels. The system includes a second interface which comprises a mechanism for transporting each of the first sub-link and the second sub-link (transmitted within the second link) over a respective one of two HDSL (High-Rate Digital Subscriber Line) twisted pairs.

The supplemental overhead information may comprise a path overhead byte having several overhead bits being used to convey several overhead parameters of the second link. In this regard, the interface may be provided with a mechanism for processing the path overhead byte. The several overhead bits may include several types of bits. For example, the several overhead bits may comprise bits used for error and performance monitoring. In addition, the several overhead bits may comprise a bit that indicates whether a path far-end bit error has occurred.

The several overhead bits may comprise a loopback control bit, and/or a mode switching bit for switching the second link between several signalling modes. In this regard, the several signalling modes of the second link may comprise a D channel ISDN signalling mode, a POTS signalling mode, and/or a PCM-30 signalling mode.

The several overhead bits may further, or in the alternative, comprise a general information bit that indicates several parameters of the second link. In this regard, the several parameters may comprise the position of the beginning of a superframe within the second link.

The several overhead bits may comprise a message bit, multiple frames of which form a message block. The several overhead bits may also comprise a bit for indicating a path remote failure present on the second link.

In accordance with a further aspect, the interface of the invention further comprises several more particular mechanisms. The interface may comprise a mechanism for assigning one memory to be a first link memory and for assigning another memory to be a second link memory. A mechanism may be provided for storing in the first link memory bytes of information received from the first link and bytes of information to be transmitted over the first link. A mechanism may also be provided for storing in the second link memory bytes of information received from the second link and bytes of information to be transmitted over the second link. In addition, a mechanism may be provided for placing supplemental overhead information into the second link memory, and for removing supplemental overhead information from the first link memory.

In an alternative aspect of the invention, a method is provided for enhancing a first standard primary rate carrier link having N channels. In the method, the first link is emulated with a second link having N+M channels. At least one supplemental overhead channel is placed within one or more additionally available channels of the second link.

In a particular aspect of the method, the second link comprises at least one standard primary rate carrier link having a standard payload portion that normally transmits payload information and a standard overhead portion that normally transmits overhead information. Further, the one or more additionally available channels, to be used for the at least one supplemental overhead channel, comprise a portion of the standard payload portion. The first and second links may comprise time-division-multiplexed links, and may transmit information in the form of a character-interleaved serial digital bit stream. The first link may comprise a T1 link, and the second link may comprise a PCM-30 link, in which case N will be 24 and M will be 8. In addition, the first link may comprise a T1 link, and the second link may comprise two T1 links, in which case N will be 24 and M will be 24.

The standard payload portion occupied by the remaining M channels may comprise channels 1–15 and 17–30 of the 32 channels, numbered 0–31, of a PCM-30 link.

In a particular aspect of the method, the supplemental overhead channel is routed to at least one out-of-band channel of a remaining set of M channels of the second link.

The method may be further particularized by providing that the supplemental overhead channel comprises a path overhead byte having several overhead bits being used to convey several overhead parameters of the second link, wherein the method further comprises the step of processing the path overhead byte. In this regard, the path overhead byte may comprise one or more particular types of overhead bits, such as those enumerated above with regard to the apparatus of the present invention.

In a particular aspect of the present invention, the method further comprises several particularized steps. In this regard, the method may comprise assigning one memory to be a first link memory and assigning another memory to be a second link memory. Bytes of information, which are received from the first link, and bytes of information to be transmitted over the first link, may be stored into the first link memory. Bytes of information which are received from the second link, and bytes of information to be transmitted over the second link, may be stored into the second link memory. In addition, supplemental overhead information may be placed into the second link memory, and supplemental overhead information may be removed from the first link memory.

In accordance with yet another aspect of the present invention, a different method is provided. The method entails transmitting information within a communications link that comprises a digital bit stream. The digital bit stream comprises superframes, frames, channels, and bits. Each superframe comprises a predetermined number of frames, and each frame comprises a predetermined number of channels. Each channel then comprises a predetermined number of bits. Several steps are performed in implementing this method. An information bit signal is formed with a kth bit of an lth channel of each frame, wherein the information bit signal includes at least five consecutive kth bits. Information is conveyed regarding the communications link within at most five of the at least five consecutive kth bits. The conveying comprises indicating one of several first states, indicating one of several second states, and indicating a particular position along the digital bit stream of the communications link.

In a particular aspect of this method, the several first states comprise several mutually exclusive states of the communications link, and the several second states comprise several mutually exclusive states of the communications link. The several first states and the several second states may collectively comprise five states.

In a particular aspect, the forming and conveying steps of the method may be performed synchronously with a frame pulse that has cycles recurring upon the passage of each frame of the bit stream of the communications link. The indicating steps may each comprise determining the level of the information bit signal when the frame pulse changes from a low level to a high level.

In another aspect of the method, the particular position, which is one of the pieces of information indicated by the information bit signal, comprises the beginning of a superframe along the digital bit stream of the communications link.

In another aspect of the invention, the second states comprise three states in which the communications link comprises a first sub-link, a second sub-link, or both the first and second sub-links. It is noted that each of the first and second sub-links are a fraction of the size of the communications link, and are transmitted within the digital bit stream of the communications link. Moreover, the first states may comprise two states in which the communications link comprises or does not comprise predetermined overhead bits that render the communications link compatible or incompatible with a particular overhead protocol.

The above-noted, and other, objects, features and advantages of the present invention will be more fully evident from the following description.

BRIEF DESCRIPTION OF THE DRAWINGS

The present invention is further described in the detailed description which follows, by reference to the noted plurality of drawings by way of non-limiting examples of embodiments of the present invention, in which like reference numerals represent similar parts throughout the several views of the drawings, and wherein:

FIG. 1 illustrates a system for converting several input channels into a byte-interleaved serial digital bit stream;

FIG. 2 illustrates a D4 framing structure of a T1 link;

FIG. 9 illustrates the main process performed by the ODIM illustrated in FIG. 7;

FIG. 10A illustrates the source link processing component of the main process shown in FIG. 9;

FIG. 10B illustrates the object link processing component of the main process shown in FIG. 9;

FIG. 12 illustrates an example embodiment of the channel mapping structure of an enhanced PCM-30 link (i.e., an object link) which comprises a mapped T1 link;

FIG. 14 is a waveform diagram that illustrates the operation of bit 6 within the path overhead byte defined in the channel mapping structure illustrated in FIG. 12; and FIG. 15 is a waveform diagram that illustrates the operation of bit of the path overhead byte.

DETAILED DESCRIPTION OF THE EXEMPLARY EMBODIMENTS

Figure 3:
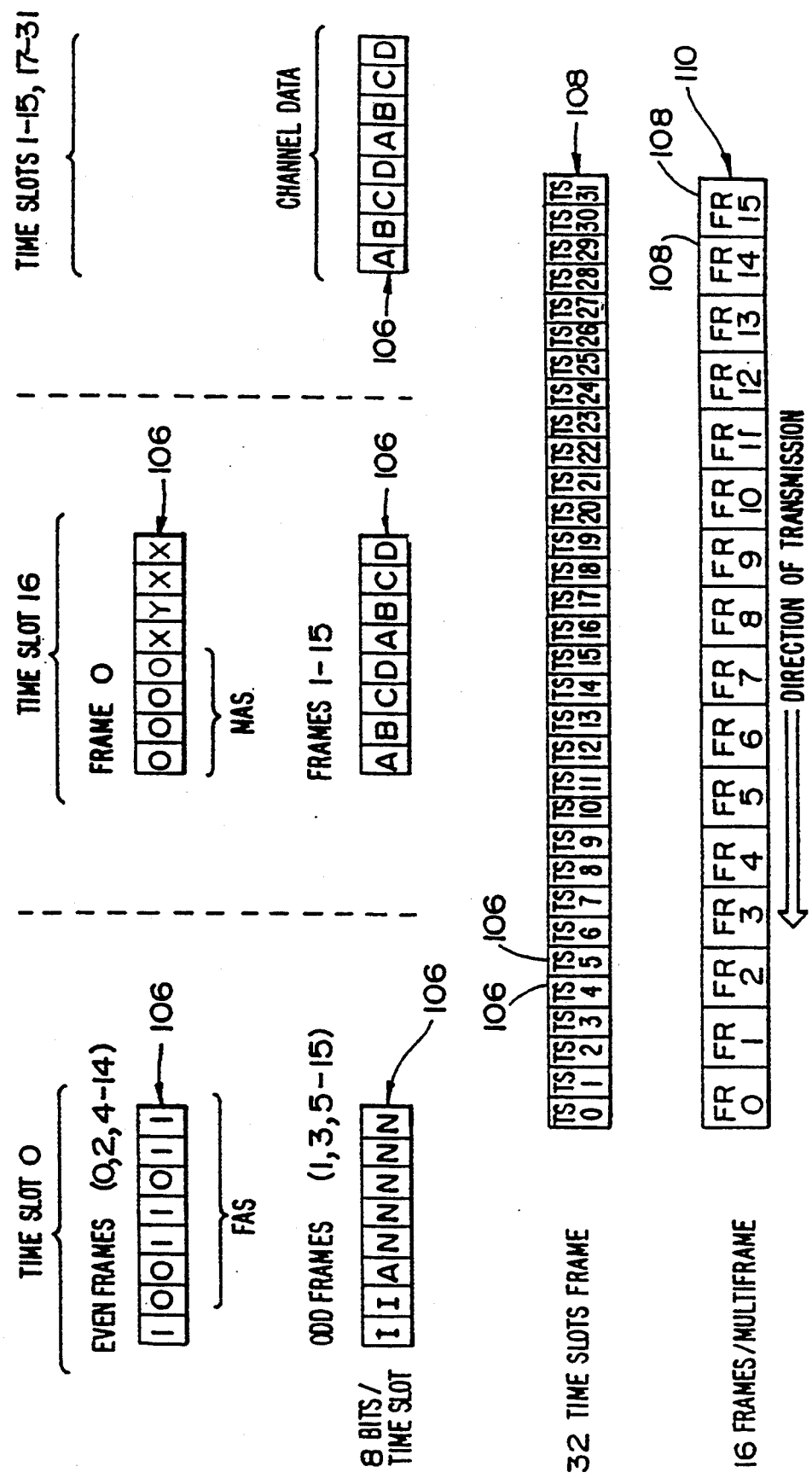
FIG. 3 illustrates a PCM-30 transmission framing format.
Figure 4:
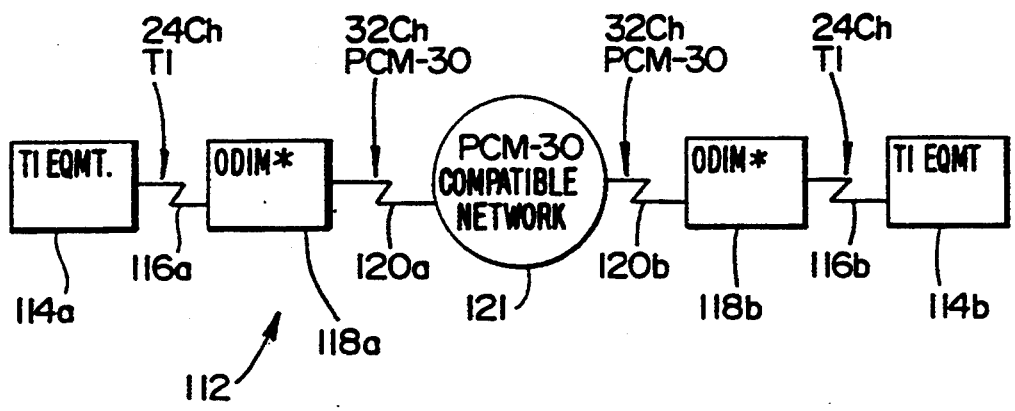
FIGS. 4, 5, and 6 show several illustrative example embodiments of a switched telecommunications network embodying the present invention.
Figure 5:
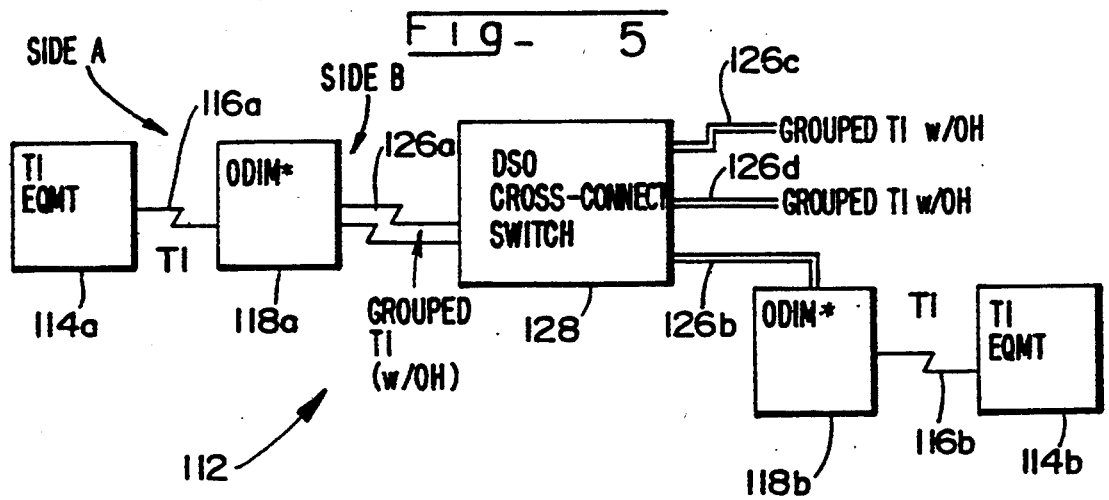
Figure 6:
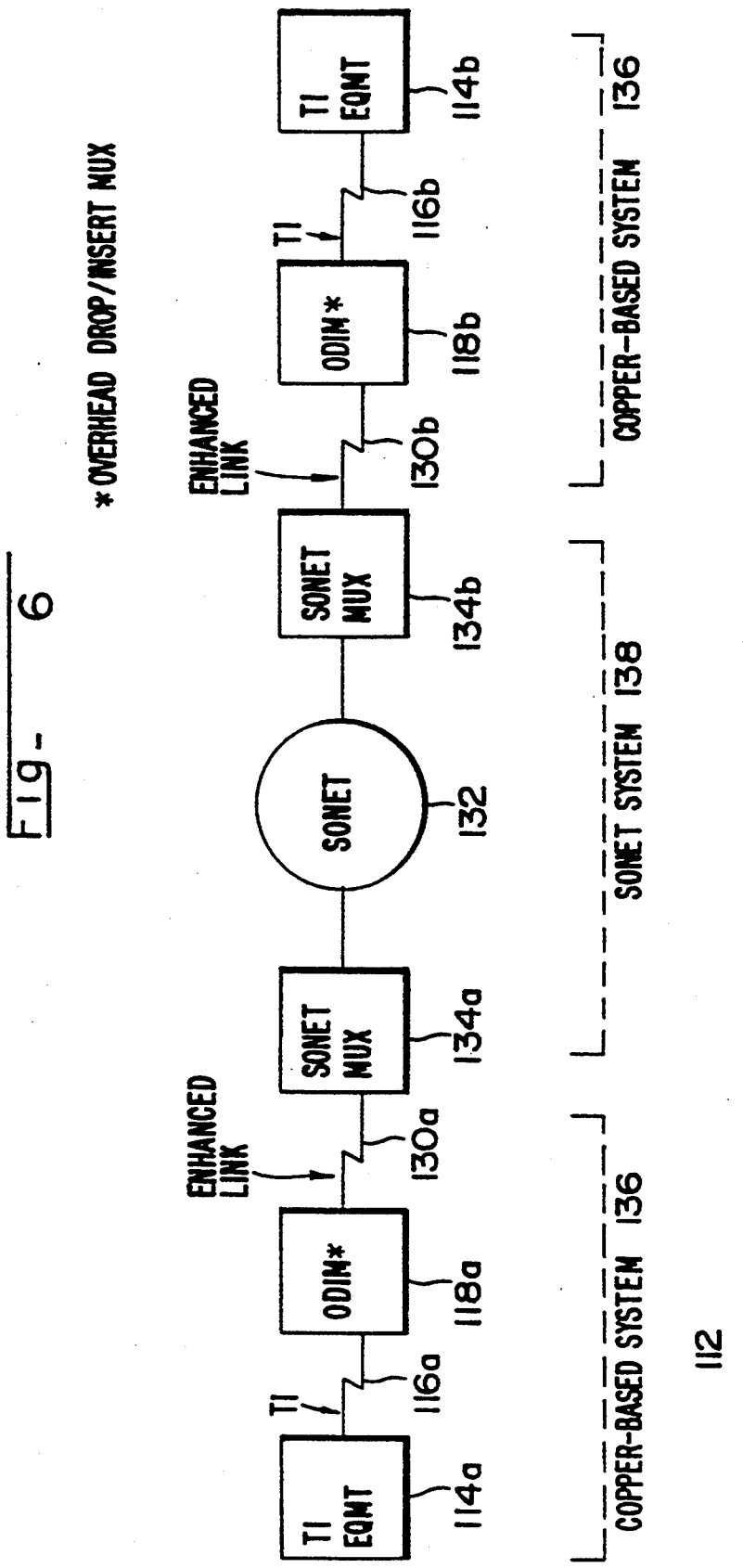

Referring now to the drawings in greater detail, each of FIGS. 4, 5 and 6 show several illustrative, but non-limiting, example embodiments of a switched telecommunications network 112 that provides enhanced, logically out-of-band embedded overhead and maintenance functions (e.g., link maintenance, signalling, performance monitoring, loopback facilities, and so on) to a primary rate telecommunications link (e.g., T1, CEPT). The enhanced overhead and maintenance functions are provided by mapping the channels of the primary rate link (a source link) onto a portion of the channels of another link (an object link) that has more channels. Remaining unused channels of the object link are then used to transmit overhead information needed to implement the enhanced overhead and maintenance functions.

Each of the exemplary embodiments illustrated in FIGS. 4, 5 and 6 are described as adding such network overhead and maintenance functions to a T1 link 116. However, it should be noted that the general features of the illustrated embodiments are equally applicable to adding network overhead and maintenance functions to a PCM-30 link, or a yet-to-be developed primary rate link (e.g., if one or more SONET links evolve to become a new primary rate carrier link).

FIG. 4 illustrates a switched telecommunications network 112. T1 equipment 114a (which comprises, e.g., a T1 network or T1-compatible equipment) is connected in cascade with a 24 channel T1 link 116a, an ODIM (Overhead Drop/Insert Multiplexer) 118a, a 32 channel PCM-30 link 120a, and a PCM-30-compatible network 121. PCM-30 network 121 is further connected to a second PCM-30 link 120b, a second ODIM 118b, a second T1 link 116b, and an additional set of T1 equipment 114b.

T1 equipment 114a may comprise a T1 facility termination including, e.g., a T1 line connected in cascade to a channel service unit, a digital service unit, and/or a DTE (data terminal equipment) and/or MUX. In the alternative, e.g., T1 equipment 114a may comprise an end office or a hub office. Each of ODIMs 118a, 118b serves as an interface between the T1 and PCM-30 links and converts the bit streams of each link to a format compatible with their counterpart link.

ODIM 118 performs two main functions: it inserts overhead information into a source link, and it drops (i.e., removes) overhead from an object link. In this case (i.e., in FIG. 4), the illustrated T1 link 116a is a source link, and PCM-30 link 120a is an object link. When ODIM 118 inserts overhead information, it adds channels to a source link (e.g., a T1 link), by, for example, mapping the source link to a comparable link having more channels (e.g., a PCM-30 link). ODIM 118 inserts the overhead information within the added channels.

When ODIM 118 drops overhead information from a link, it removes the overhead channels from the object link (e.g., PCM-30), and rearranges the remaining channels in the form of the source link (e.g., a T1). The ODIM takes the removed overhead information from the added channels, and interprets, modifies and/or stores the overhead information.

FIG. 5 illustrates a switched telecommunications network 112, which comprises a first set of T1 equipment 114a, and a second set of T1 equipment 114b. Several devices, which are connected between the first and second sets of T1 equipment 114a, 114b, include a T1 link 116a, connected to an ODIM 118a, a grouped T1 link 126a, a DS0 cross-connect switch 128, a second grouped T1 link 126b, a second ODIM 118b, and a second T1 link 116b.

Each of the grouped T1 links 126 transports information in a byte-interleaved serial digital bit stream. The collective bit streams of the grouped T1 include 24 in-band channels and several out-of-band channels. The out-of-band channels transport overhead and maintenance information. Each of the non-grouped T1 links 116 also transport information in the form of a byte-interleaved serial digital bit stream, but include only in-band channels.

A standard T1 link is capable of transporting 24 channels of information. In order to accommodate added out-of-band overhead channels within an "object" link (a non-grouped T1 link 116 emulated by a grouped T1 link 126), each of the grouped T1 links 126 comprises several T1 links. In the illustrated embodiment, each grouped link comprises two T1 links.

The routing of information over the links is controlled by DS0 cross-connect switch 128. In this embodiment, each of the individual T1 links within a grouped T1 link 126 is configured to transmit signalling information so that DS0 cross-connect switch 128 will route both of the related T1 links to the same destination, e.g., toward the second ODIM 118b, via the second grouped T1 126b.

Unless otherwise specified, each link illustrated herein is capable of transmitting information in two directions. Referring to the first ODIM (Overhead Drop/Insert Mux) 118a, illustrated in FIG. 5, the operation of ODIM 118a will now briefly be described with reference to the direction of transmission. Information which is being transmitted from side A, towards side B, is rearranged by ODIM 118a, so that it is compatible with the format utilized by grouped T1 link 126a. Accordingly, the digital bit stream within non-grouped T1 link 116a is supplemented by ODIM 118a, with several added overhead channels, to form a new byte-interleaved serial digital bit stream which is compatible with grouped T1 link 126a. In this particular embodiment, the conversion results in the formation of two separate byte-interleaved serial digital bit streams, which are concurrently transmitted over the individual T1 links within grouped T1 link 126a.

In the reverse direction, from side B to side A, ODIM 118a removes the out-of-band overhead bytes from the grouped T1 link, and combines the remaining in-band bytes into a single byte-interleaved serial digital bit stream which is compatible with non-grouped T1 link 116a. Second ODIM 118b, illustrated in the embodiment of FIG. 5, operates in an identical manner to that of the first ODIM 118b. The other ODIM's referred to herein operate in a generally similar manner to that described with reference to the embodiment illustrated in FIG. 5. Differences are, of course, contemplated, and depend on several factors, such as link protocol and hardware constraints.

FIG. 6 illustrates a SONET-based switched telecommunications network 112. A SONET system 138 is coupled to a copper-based (non-SONET) system 136. Each portion of the copper-based system 136 includes a set of T1 equipment 114a,b, a T1 link 116a,b, an ODIM 118a,b, and an enhanced (object) link 130a,b. The enhanced link 130a,b, of each of the portions of the copper-based system 136 are each connected to a respective SONET multiplexer 134a,b, of SONET system 138.

Enhanced links 130a, 130b include an abundant channel structure which is capable of transporting out-of-band overhead bytes compatible with the SONET protocol of SONET system 138. Enhanced links 130a, 130b may be implemented with a primary rate carrier link that transports more than 24 channels (e.g., a PCM-30 link), or may comprise two or more links grouped together (e.g., a grouped pair of T1 links).

Each of the ODIMS 118a, 118b drops overhead information from an enhanced link, in order to transport the information over the corresponding T1 link, and adds overhead information to the information being transported by the T1 link, in order to make the same compatible and ready for transmission over the enhanced link. The information being transported by each of the enhanced links 130a, 130b is then transported over the SONET system 138 by means of a virtual tributary (VT) structure of SONET. Performance monitoring and embedded signalling information (i.e., overhead) that accompanies a SONET system may be transmitted over the out-of-band overhead bytes that are present within the enhanced links 130a, 130b, which are part of the copper-based system 136. An appropriate routing mechanism can be provided within SONET MUX 134a and 134b, using standard technology, for directing the SONET overhead bits to the out-of-band overhead bytes within enhanced links 130a, 130b. Accordingly, the benefits of the out-of-band overhead information of the SONET system can be extended beyond the SONET system 138, to the copper-based system 136, by means of the enhanced links 130a, 130b, and ODIMS 118a, 118b.

An ANSI standards document for SONET VT T1.105, "Digital Hierarchy-Optical Interface Rates and Format Specifications [SONET]", ANSI T1.105-1991, discloses several overhead protocols of SONET VT structures, and the format specifications of various overhead bytes that may be utilized. This document, and thus the protocols and specification therein, is expressly incorporated by reference herein in its entirety.

FIG. 12 shows a channel mapping structure for mapping a clear channel T1 link to an enhanced PCM-30 link having 32 channels numbered CH00–CH31. The first twelve channels of the T1 link are assigned to an A link and are mapped to channels CH01–CH12 of the enhanced PCM-30 link. The second twelve channels of the T1 link are assigned to a B link, and are mapped to channels CH17–CH28 of the enhanced PCM-30 link. The remaining channels, CH00, CH13–CH16, and CH29-CH31, are out-of-band, and include synchronization, signalling, and overhead information.

As described above, the ODIM (Overhead Drop/Insert Multiplexer) of the present invention performs two main functions. The ODIM inserts overhead information into a source link, and it drops (i.e., removes) overhead from an object link. In doing so, the ODIM maps the respective channels of one link to the other link. FIG. 12 is an example of a structure for mapping a T1 (source) link onto a PCM-30 (object) link.

Figure 7:
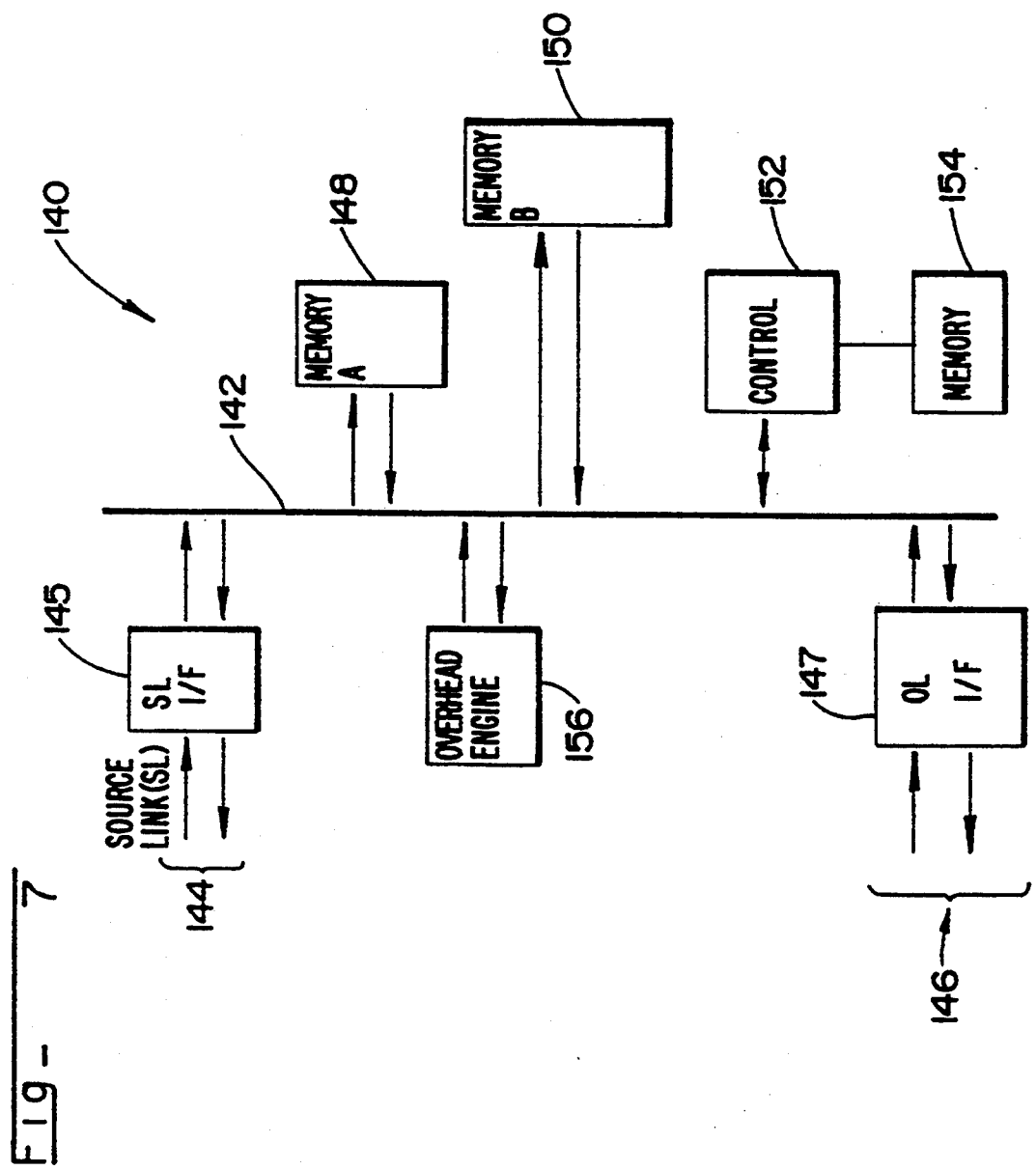
FIG. 7 illustrates an example embodiment of an Overhead Drop/Insert Multiplexer (ODIM)

FIG. 7 is an illustrative, but non-limiting, example embodiment of an ODIM 140, that may be utilized to perform the functions of each of the ODIMs 118 (a and b) illustrated in the various exemplary embodiments provided herein. The ODIM 140 illustrated in FIG. 7 includes several devices connected to a bus 142. The ODIM includes a source link interface (SL I/F) 145 and an object link interface (OL I/F) 147, both of which are connected to bus 142. ODIM 140 also includes an overhead engine 156, a control module 152, and two memories (A and B) 148,150, each also connected to data bus 142. Control module 152 is connected to a control memory 154. Each of the source link and object link interfaces 145 and 147 are connected respectively to a source link 144, and to an object link 146. The source link may comprise, e.g., a T1 link. The object link may comprise, e.g., a PCM-30 link, or a grouped T1 link. Interfaces 145 and 147 may be implemented with interfaces which are commercially available, and have a first mode for interfacing with a 24 channel T1, and a second mode for interfacing with a 32 channel PCM-30. One example of a commercially available interface is provided by Rockwell International, and is referred to as the Rockwell R8070 T1/CEPT device. The Rockwell International Semiconductor Products Division has published, in November of 1988, a T1/CEPT (PCM-30) Primer, Doc. No. 29300N10, Order No. 310, Rev. 2, which provides, inter alia, an overview of the Rockwell T1/CEPT device. This document is incorporated herein by reference in its entirety.

In the illustrated embodiment ODIM of FIG. 7, which is described herein by way of example, each of interfaces 145 and 147 are connected to bus 142 by means of a parallel 8-bit wide interface (not shown). Accordingly, source link interface (SL I/F) 145 transfers information to and from source link 144 byte-by-byte. Similarly, object link interface (OL I/F) 147 transfers information to and from object link 146 in a byte-by-byte fashion.

Control module 152 is responsible for clock distribution to each of the devices of ODIM 140, and further handles frame synchronization, slip buffering (e.g., by inserting zeros in places where no information is otherwise placed in a particular byte of a link), memory access arbitration, and memory address generation. Control device 152 causes bytes of data from source link 144 and object link 146 to be placed in the A and B memories 148, 150 for an interim period of time, and to be addressable by the other modules of the ODIM for modification, storage, and/or retrieval.

Figure 8:
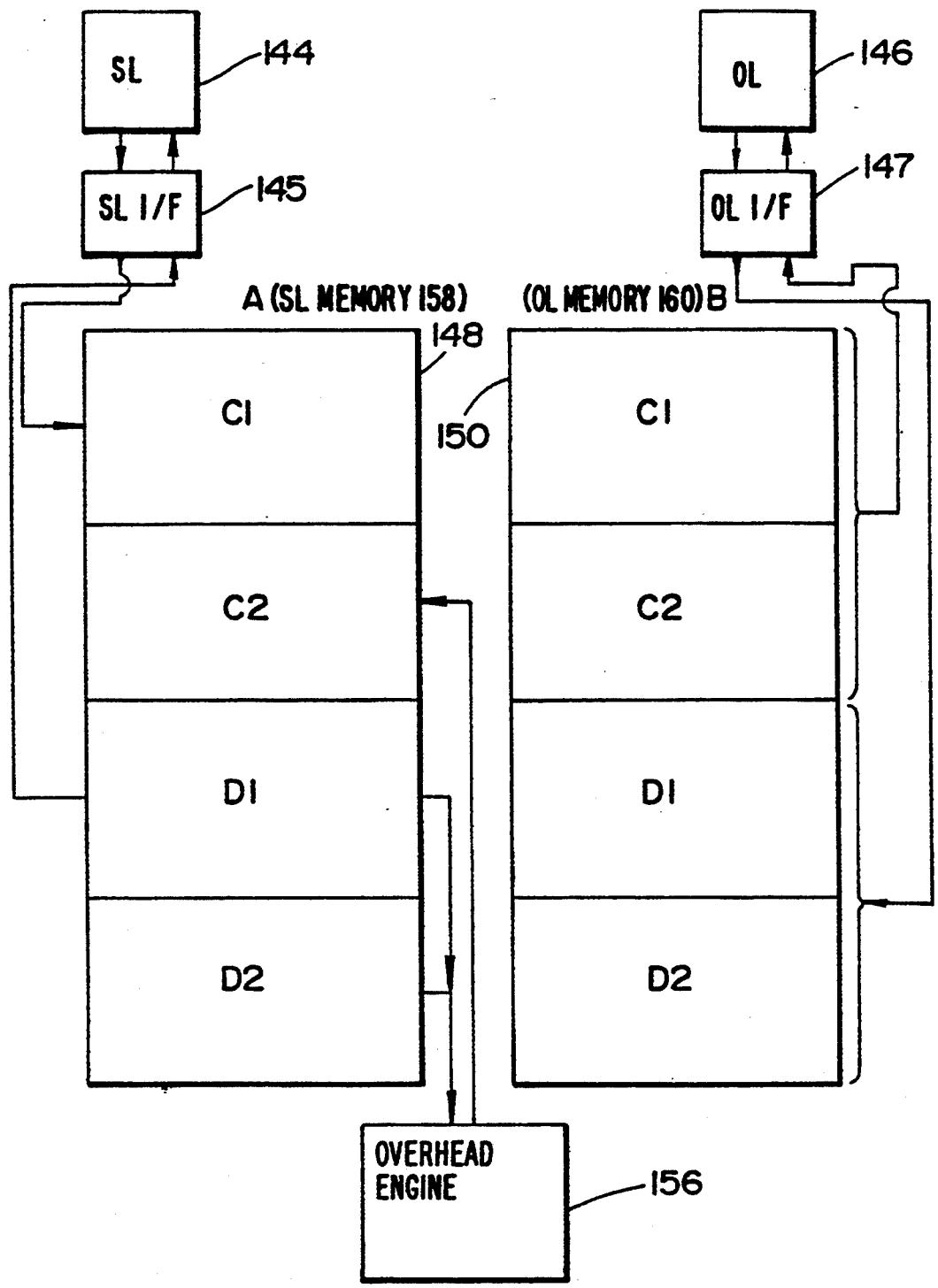
FIG. 8 illustrates a block diagram that demonstrates the functional relationship between the various modules/sections of an ODIM.

FIG. 8 is a block diagram which illustrates the functional relationship between the various modules/sections of the ODIM. Information bytes which are received by SL I/F 145 (and thus are intended for transmission to object link 146) are placed within a first portion C1 of an assigned SL memory (which is illustrated as being assigned to memory A 148). In the meantime, overhead engine 156 writes any appropriate bytes of overhead and other out-of-band information into section C2 of SL memory 158.

At a certain time, the identifications of SL memory 158 and OL memory 160 are switched, so that OL memory 160 becomes memory A 148. Once that switch is made, the source link information and any added out-of-band information, which were previously placed within sections C1 and C2 as described above, will be read out of OL memory 160 and forwarded to the transmit side of OL I/F 147, for transmission over object link 146.

Data which is being received by OL I/F 147, from the object link, is written into sections D1 and D2 of OL memory 160; the in-band information is written into section D1, and the overhead information is written into section D2. Once this data is completely written into sections D2 and D2 of OL memory 160, which will likely be at about the same time that all the data has been written into portions C1 and C2 of SL memory 158, the assignments of the SL memory 158 and OL memory 160 are again switched. At this point, the in-band T1 information is read out of memory portion D1 of SL memory 158, and forwarded to the transmit side of SL I/F 145, for transmission over source link 144. Meanwhile, the in-band and out-of-band information are read out of sections D1 and D2 of SL memory 158, and are processed by overhead engine 156.

FIG. 9 illustrates the main process performed by ODIM 140 which is illustrated in FIG. 7. At a step S100, the control device assigns memories A and B to the respective SL memory and OL memory of the ODIM. Subsequently, two processes are activated concurrently: the SL processing a step S102 and the OL processing at step S104. After execution of both steps S102 and S104, at step S106, control device 152 will switch the assignments of the memories A and B. This switching of the memory assignments will only be performed at or before the length of time that it takes for a given segment of a serial digital bit stream to be processed by each of the SL processing S102 and the OL processing S104. The length of a given segment is noted in FIG. 9 as being equal to 500 μsec. This corresponds to the length of four frames of either a T1 or a PCM-30 link. Accordingly, in this illustrated embodiment, the ODIM will perform its channel mapping and dropping-/inserting of overhead information on four frames at a time. This renders the object link compatible with a SONET VT operating in the floating VT mode of transport, in which 4 consecutive 125 μsecond frames are grouped into a 500 μsecond superframe. Of course, the given segment operated on by ODIM 140 is not limited to this length, and may be set to a smaller or larger value depending upon, e.g., the framing structure of the object and source links.

FIG. 10A illustrates the steps performed during the source link (SL) processing. Step S108 defines the number N of iterations which the SL processing will go through, and determines, for each iteration, whether or not all of N frames of information have been acted upon by the ODIM. For the case where the source link is a T1 link, a determination will be made at step S110 as to whether or not the last channel of a particular frame was just acted upon by the SL processing. If so, this indicates that the present byte being forwarded by the SL I/F of the ODIM contains the T1 multiframe alignment signal of the source link which is positioned as the 193rd bit within a frame; if the present byte contains the multiframe alignment signal, the process proceeds to step S112. At step S112, for information received by the SL I/F, the incoming frame bit will be placed in a buffer by control module 152 (e.g., within control memory 154), and for information which is to be transmitted by he SL I/F onto the source link, the frame bit is inserted into the serial digital bit stream of the source link.

Thereafter, the process will proceed to the first channel of the next frame, and execute step S114.

As noted above, the source link processing is performed one byte at a time. The SL interface 145 of the ODIM accepts bytes for transmission over source link 144, and outputs bytes received from source link 144, in accordance with a particular byte-transfer clock pulse. In the interim between byte-transfer clock pulses, all of the steps of the SL processing illustrated in FIG. 10A are performed. Accordingly, each of the steps illustrated in FIG. 10A may be executed in accordance with a particular clock pulse, which is issued at a higher rate than the byte-transfer clock pulse.

In the illustrated, but not limiting, example source link processing of FIG. 10A, each of steps S114, S116, S118, and S120 are performed in one of four consecutive cycles, which occur in the interim between each byte-transfer clock pulse of the SL I/F. In a first cycle (cycle a), at step S114, if the particular byte being acted upon comprises out-of-band information, the process will remain idle during that cycle. Otherwise, in-band source link information will be written into the source link (SL) memory. In cycle b, step S116 will be performed, at which time out-of-band information will be written into the SL memory. In cycle c, at step S118, in-band information from the object link will be read out of the SL memory and input to the transmit side of the source link interface, for subsequent transmission onto the source link. Thereafter, at cycle d, in step S120, the out-of-band information from the object link is read and is input to the overhead engine. The process then returns to step S108, and repeats steps S108–S120, until such time as all of the N frames of link information have been processed.

The object link processing is illustrated in FIG. 10B. The timing of the object link processing is dependent upon the rate of transmission of the object link. Thus, the rate by which the bytes must be provided to the object link interface of the ODIM will determine the timing of the steps performed in the object link processing. More particularly, all of steps S122, S124 and S126 are performed within the time between each transfer of a byte to/from the object link interface. If the object link is a PCM-30 link, each byte will be transferred to/from the object link interface (OL I/F) at a rate of 0.256 Mhz, which corresponds to a time between bytes of about 3.90625 microseconds.

The process comprises a loop which is monitored at step S122, and continues for N frames of the object link, whereby each of steps S124 and S126 will be performed on a particular byte of the serial digital bit stream received from or transmitted over the object link. At step S124, a byte of data which has been received from the object link by the object link interface will be written into the object link (OL) memory. In step S126, a byte of data will be read from the OL memory in accordance with the channel mapping scheme, and sent to the transmit portion of the (OL) interface, for subsequent transmission on the object link.

Referring back to FIGS. 7 and 8, it is noted that bytes of in-band information and out-of-band information will be kept track of by control module 152, by, e.g., keeping a memory lookup table within control memory 154. The information intended for transmission over the object link (i.e., the OL-bound information) may be physically separated from the SL-bound information, by placing these two categories of information in segments C and D, respectively. Similarly, the in-band information may be separated from the out-of-band information by dividing each of the portions C and D into sub-portions C1 and C2, and D1 and D2. In the illustrated example, memory sections C1 and D1 are used to store in-band information (including payload information) and sections C2 and D2 are used to store out-of-band information. In any event, control module 152, in connection with control memory 154, will comprise a mechanism (e.g., a table structure) for keeping track of the different types of information, and the ordering thereof, so that the appropriate bytes can be fetched and transmitted in their appropriate order.

Overhead engine 156 performs the necessary processing and monitoring of link information so that it can generate, retrieve, and output the overhead information being dropped and inserted by the ODIM 140 illustrated in FIG. 7. One example of the monitoring to be performed by overhead engine 156 is the monitoring of the data stream incoming on Source Link 144 for purposes of parity generation. Examples of the overhead processing performed by overhead engine 156 include, e.g., forwarding messaging information received in an overhead messaging bit (e.g., bit 7 of the path OH byte disclosed herein) to a messaging transceiver, and switching the configuration of the system depending on the status of an overhead "switch" bit (e.g., signalling scheme bit 5).

Figure 11:
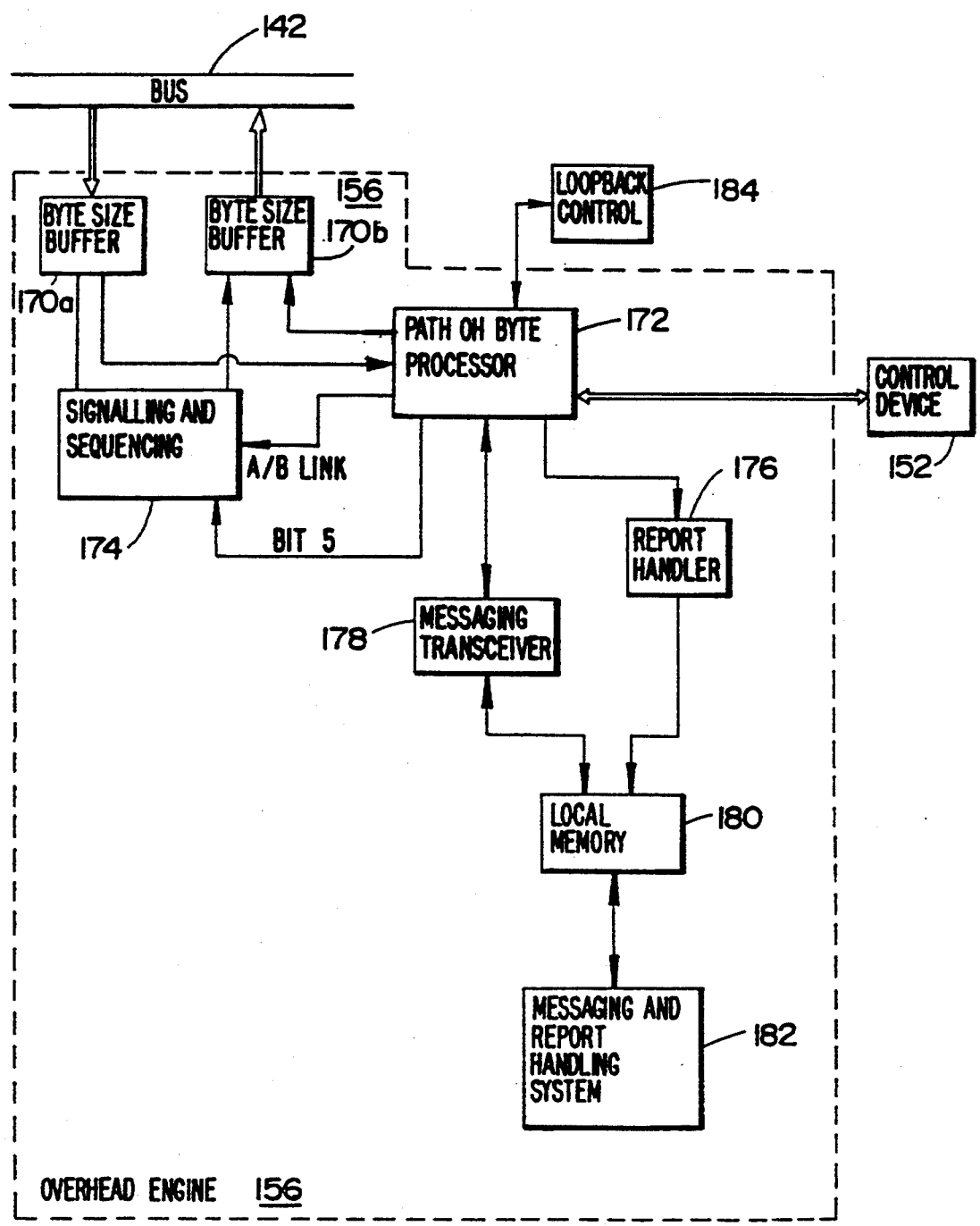
FIG. 11 illustrates one example embodiment of an overhead engine to be used in conjunction with the ODIM illustrated in FIG. 7.

FIG. 11 illustrates an example embodiment of an overhead engine 156 that can be utilized with the ODIM illustrated in FIG. 7. This illustrated overhead engine 156 will now be described, and the operation thereof will be explained with reference to the channel mapping structure of FIG. 12.

Overhead engine 156 is coupled to the main bus 142 (of ODIM 140) via two byte size buffers 170a, 170b, and comprises a path OH (Overhead) byte processor 172, and several other devices or modules connected thereto. A signalling and sequencing module 174 is connected to OH byte processor 172 and each of buffers 170a, 170b. Various OH processing modules are connected to OH byte processor and include a loopback control module 184, a report handler 176, and a messaging transceiver 178. Each of messaging transceiver 178 and report handler 176 are connected to a local memory 180, which is in turn connected to a messaging and report handling system 182. Path OH byte processor 172 is also connected to control device 152, e.g., to forward all important information to control device 152 of the overall ODIM (FIG. 7) so that the control device can perform its functions, such as frame synchronization and slip buffering.

The illustrated channel mapping structure, shown in FIG. 12, has the following out-of-band channels which are operated on by overhead engine 156:

CH00 A Link FAS
CH13 Path OH Byte for A Link*
CH14 Signalling Byte—for A Link, or both A and B
CH15 A Link MAS
CH16 B Link FAS
CH29 Path OH Byte for B link*
CH30 Signalling Byte—for B Link, or both A and B
CH31 B Link MAS

*The Path OH Byte for each of the A and B links includes several mechanisms for performing link "housekeeping", performance monitoring, and maintenance of the A and B links of an enhanced object link, and will be described more fully hereinbelow. In general, the Path OH Byte transmits non-payload information used for several functions as follows:
(1) detecting parity errors,
(2) indicating whether an ODIM-compatible device is connected to the enhanced object link,
(3) controlling loopback,
(4) identifying the signalling scheme being used by the enhanced object link,
(5) indicating whether the enhanced object link is transmitting an A link, a B link, or both A and B links,
(6) messaging, and
(7) indicating whether a path remote failure has occurred.

In operation, overhead engine 156 (illustrated in FIG. 11) processes out-of-band overhead information that concerns the path OH byte, signalling, and acquisition sequencing. Path OH byte processor 172 performs all processing that concerns the path OH byte, and gathers information needed for its processing from the SL-bound serial bit stream, stored in memory sections D1 and D2 of SL memory 158 (FIG. 8).

As a result of the processing performed by OH byte processor 172, OH byte processor outputs several parameters for use by several other modules within overhead engine 156. For example, Bit 5 is forwarded to an appropriate input of signalling and sequencing (SS) module 174, since Bit 5 defines the signalling scheme (D channel, POTS, or PCM-30) used by the enhanced object link. In addition, an A/B link indication signal is provided to signalling and sequencing (SS) module 174 by OH byte processor 172, so that signalling and sequencing (SS) module 174 can modify its operation depending on whether only one, or both, of the A and B links are being transported over the Object Link.

OH byte processor 172 also outputs and receives, to/from messaging transceiver 178, information that relates to the messaging link formed by Bit 7 of the path OH byte. Error or performance information, status information, and other types of relevant data that is appropriate for logging and/or reporting in a monitoring system, is forwarded to report handler 176. Local memory 180 is used as an interim storage for data that messaging transceiver 178 and report handler 176 send to and/or receive from messaging and report handling system 182. Messaging and report handling system 182 may be configured to perform functions such as storing information for later retrieval by a system operator, and sending information to another location via the message link (e.g., bit 7 of the path OH byte) or via a separate transmission link using any appropriate transmission medium. Messaging and report handling system 182 could also be configured to display and/or print reports based upon the error and performance information obtained by the overhead engine.

Another output of path OH byte processor 172 carries a signal to be used by loopback control module 184. In terms of the path OH byte defined above, OH byte processor 172 forwards Bit 4 to loopback control module 184. Bit 4 may contain information concerning the identity of a device along a link at which a loopback is to be performed. Bit 4 may be used to transmit loopback control information in accordance with one of several known methods and systems for performing loopback diagnostic testing of serial digital bit stream links. On the other hand, Bit 4 may be configured in conformance with the loopback system and method described in a commonly assigned application filed by Andy Turudic on even date, entitled "Out-of-Band Loopback Control Scheme", Attorney Docket Number P11556, the entire disclosure of which is incorporated by reference herein.

Signalling and sequencing (SS) module 174 performs the appropriate functions relating to the signalling and acquisition sequencing bytes within the Object Link. Bit 5 and the A/B link indication signal, both forwarded by path OH byte processor 172, are used by signalling and sequencing (SS) module 174 to switch the module between different operation modes. For example, depending on the A/B link indication signal (which is acquired based on information forwarded within general information Bit 6 of the path OH byte), signalling and sequencing (SS) module 174 will be placed within an A link mode, a B link mode, or an AB link mode.

When in the A link mode, SS module 174 will only form A link OL-bound acquisition sequencing bytes (i.e., channels CH00 and CH15) and an A link OL-bound signalling byte (channel CH14). In addition, SS module 174 will only process incoming acquisition bytes and signalling information (being received from the Object Link) for the A link.

Similarly, when in the B link mode, SS module 174 will only form B link OL-bound acquisition sequencing bytes (i.e., channels CH16 and CH31) and a B link OL-bound signalling byte (channel CH30). In addition, SS module 174 will only process incoming acquisition bytes and signalling information (being received from the Object Link) for the B link.

Control device 152 will perform slip buffering for the unused bytes within an enhanced object link, when just an A or B link is being transported.

When in the AB link mode, SS module 174 will form A and B link OL-bound acquisition sequencing bytes (i.e., channels CH00, CH15, CH16, and CH31) and A and B link OL-bound signalling bytes (channels CH14 and CH30). In addition, SS module 174 will process incoming acquisition bytes and signalling information (being received from the Object Link) for the A and B links.

Bit 5 can be used to switch between several alternative signalling scheme modes. Three example signalling schemes include the D channel ISDN-type, POTS (e.g., D4 type), and PCM-30 signalling. Depending on the signalling scheme indicated by Bit 5, SS module 174 may be configured to process the A and B signalling bytes (CH14 and CH30) in conformance with the chosen scheme.

Byte size buffers 170a, 170b include an input buffer 170a, and an output buffer 170b. These buffers each hold one byte of data, since the processing performed by the ODIM (as described with reference to FIGS. 9, 10A, and 10B) is performed one byte at a time. However, this configuration is only one example, and does not preclude a different mechanism for interfacing the overhead engine with the main bus of the ODIM.

An illustrative, but non-limiting, example embodiment of the channel mapping of an enhanced (object) PCM-30 link is depicted in FIG. 12. As shown in FIG. 12, the first twelve of the available message (in-band) channels (CH01–CH12) in the primary digital signal of a PCM-30 link will be allocated for clear channel transport of the first twelve channels of a T1 source link. This portion of the enhanced link will be the payload portion of a link referred to as the "A link". Similarly, the second twelve T1 channels (channels 12–23 of a T1 source link) will be allocated to channels CH17–CH28, and will be the payload portion of a link referred to as the "B link". The A and B links can be combined into a single PCM-30 link for transportation within a network by various physical equipments. For example, in the case where a SONET network is utilized, a PCM-30 virtual tributary, such as a VT2 transport layer, may be utilized. Each of the A and B links may be transported within a single T1 link, and thus may be transported within a SONET network with the use of virtual tributaries such as the VT1.5, or VT2, or may be transported on a non-SONET link such as a copper-based T1 link.

Th channel mapping structure illustrated in FIG. 12 includes two sets of framing channels. The first set (CH00 and CH16) indicates the Frame Acquisition Sequence of each of the A and B links, and the second set (CH15 and CH31) includes information regarding the Multi-frame Acquisition Sequence of a PCM-30 link. A Frame Acquisition Sequence is provided for each of the A and B links, in order to allow for varying delays between the links. Similarly, the MAS (Multi-frame Acquisition Sequence) has been allocated to each of the A and B links, also to allow for varying delays between the respective A and B links.

Each of channels CH14 and CH30 may be allocated as POTS channels corresponding to the lower (A) and upper (B) sets of 12 T1 channels respectively. The POTS channels can be used for DTMF/DP signalling resources per A and B link, and may also be used to provide 64 Kb/s data/voice transmission. These channels may also correspond to clear channel signalling (in the form of ISDN signalling) of 64 Kb/s links, and thus may facilitate clear channel signalling per A and B link, or for the complete enhanced PCM-30 (object) link. For the case where ISDN signalling is being used, and particularly 23B+D T1 signalling is being used, the system may be configured so that CH14 will be used while CH30 remains reserved/unused.

SONET VT2 could terminate as a single pair HDSL (carrying a half T1), and transmit information at half the PCM-30 rate (1.024 Mb/s) for end-to-end maintainable links, or at the HDSL T1 rate for non-maintainable links (i.e., links with limited performance monitoring). Accordingly, in the illustrated embodiment, two sets of information are passed regarding signalling, framing, maintenance and performance monitoring.

In addition, one may also provide clear channel T1 signalling using the CCITT (PCM-30) method of signalling and its associated network equipment. In accordance with the particular channel mapping structure shown in FIG. 12 one may choose ISDN signalling, regular D4 signalling (POTS), or another type of signalling. Error correction or data encryption may be included in any unused channels. Thus, e.g., when two T1 links are used for an enhanced object link with the channel mapping structure of FIG. 12, eight unused channels will be available, e.g., for transporting error correction and/or data encryption information. When a PCM-30 link is used as the enhanced object link, and only one of the A and B links is occupied, sixteen unused channels will be available.

The channels CH13 and CH29 comprise path overhead bytes for the respective A and B links. Each path overhead byte facilitates end-to-end performance monitoring and maintenance of the enhanced link on a per-frame basis, and is defined as follows:

PATH OVERHEAD BYTE DEFINITION

Bit 1

Error and performance monitoring are performed with the use of this bit, in accordance with the same technique used by Bit 1 of the SONET VT path overhead bit. It is noted that the information acquired from the Bit is computed across 16 superframes.

Bit 2

This Bit also performs error and performance monitoring, in the same manner as the SONET VT path overhead Bit 2, and is also computed across 16 superframes.

Bit 3

This Bit may be utilized as a path far-end bit error indicator, and will be set when one or more parity errors are detected at the ODIM level. The information will be sent to the originating party.

Bit 4

This is the loopback control bit.

Bit 5

Bit 5 is utilized for the signalling scheme, and may be used to choose between D channel signalling when reset (i.e., low), POTS when set (i.e., high), and PCM-30 when alternating. This Bit, in accordance with the example embodiments described herein, will be valid for 16 superframes and must be changed for 16 consecutive superframes before the signalling scheme will be changed.

Bit 6

This is a general information bit, which will be described in further detail below.

Bit 7

This bit is used as a message link, and will be further described below. A message superframe occupies 64 frames of the link's bit stream.

Bit 0

This bit is used to indicate a path remote failure. To allow 56 Kbs network compatibility (i.e., allow other network components to use Bit 0 for signalling if needed), a majority of bits scheme may be used, mostly 1's indicating a failure, and mostly 0's indicating an OK state.

The channel mapping structure of FIG. 12 is divided into an A link and a B link. This allows the mapping structure to be compatible with a grouped T1 link, such as that shown in FIG. 5, or with a single PCM-30 link such as that used in the embodiment illustrated in FIG. 4. The specific mapping structure illustrated in the present detailed description does not preclude the use of a different channel arrangement, such as, e.g., one that is not divided into separate links and has only one path overhead byte.

The 15th and 31st channels (channels CH14 and CH30) of the enhanced link, as illustrated in the channel mapping structure of FIG. 12, allow independent signalling of the A and B links. Accordingly, the A and B links may be independently switched to different locations. A method of performing such switching is that of the ISDN standard rate 23B+D. The channel mapping structure of the link may be configured so that one may assign a complete enhanced link (including links A and B) with only the use of channel CH14, but also may be configured so that one may independently assign the A and B halves of the enhanced link by use of the respective channels CH14 and CH30.

The two portion (half-T1) structure of the enhanced link illustrated in FIG. 12 may be particularly useful in the context of an HDSL (High-rate Digital Subscriber Line) system. In an HDSL system, each communications line (HDSL) comprises a twisted pair of wires that transmit information bi-directionally. Two of such lines are usually used for the transmission of 24 channels in each direction, with 12 channels being transmitted bi-directionally on each HDSL. Some advantages associated with an HDSL system are the bi-directional capability thereof, and the fact that the range between terminating and repeater equipment for a typical two-way HDSL twisted pair is greater than that of a copper-based T1 link. In addition, HDSLs will operate over conventional unconditioned loop plants.

Figure 13:
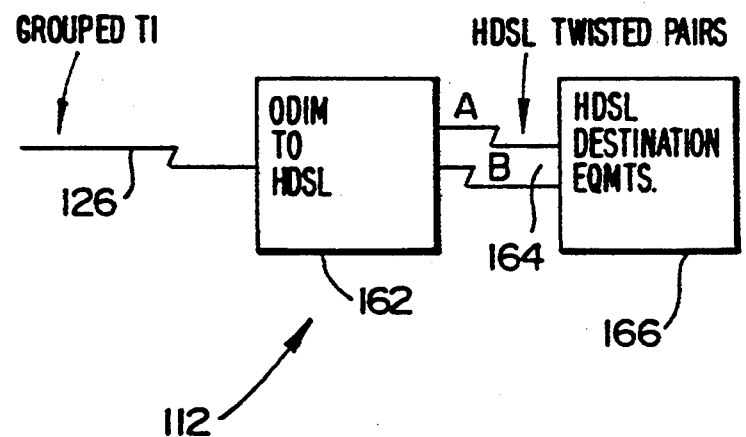
FIG. 13 illustrates a portion of a switched telecommunications network which includes, among other items, a grouped T1 link and A and B HDSL twisted pairs connected to HDSL destination equipment.

FIG. 13 illustrates a portion of a switched telecommunications network 112 which includes a grouped T1 link 126 connected to a set of terminating equipment (an ODIM-to-HDSL device) 162 which performs the combined functions of an ODIM and conversion to and from a format compatible with HDSL transmission. Two sets of HDSL twisted pairs 164 are connected between the ODIM-to-HDSL device 162 and HDSL destination equipment 166. Each of the A and B links from the grouped 1 are routed to the respective A and B HDSL twisted pairs 164. If separate parties are connected to the respective one-half T1 links (A and B), then separate signalling channels; such as channels CH14 and CH30, may each be utilized to control the routing of the respective one-half T1 links (A and B).

On the other hand, if HDSL equipments 166 terminate at one location or comprise a unitary set of data terminal equipment, then only one signalling channel is needed for the complete T1 link. In the case of the channel mapping structure illustrated in FIG. 12, only channel CH14 need be used; but, in order to simplify the switching intelligence of the system, both channels CH14 and CH30 may include information that simultaneously direct each of the one-half T1 links to the same destination.

For further information regarding HDSL systems, reference is made herein to a Technical Report entitled "High-Bit-Rate Digital Subscriber Lines [HDSL]", DRAFT TIE1.4/92-002R1 the content of which is expressly incorporated by reference herein in its entirety.

The overhead, i.e., "housekeeping", functions performed by the channel mapping structure illustrated in FIG. 12 include, inter alia, parity checking, loopback, bit-error indication, and path failure indication. In addition, a messaging link is provided within each of the A and B links, and an overhead bit is provided that indicates whether or not a path is equipped with a device for interpreting the overhead information. A signalling mechanism may further be provided for switching between two modes or two types of signalling, e.g., between a D channel type signalling system and a D4 type signalling.

An illustrative, but non-limiting, example path overhead byte definition is introduced above, in connection with the channel mapping structure illustrated in FIG. 12. The illustrated path overhead byte facilitates the implementation of several overhead functions in an out-of-band part of a byte-interleaved serial digital bit stream link.

With the provision of an out-of-band overhead byte, each bit can be used to convey various types of information within the digital bit stream of the object link. One such method is proposed herein with respect to information bit 6 in the defined path overhead byte. The method includes a step of forming an information bit signal with several frames worth of Bit 6 of the path OH byte. Information is then conveyed with the use of a limited number of consecutively gathered bits that form the information bit signal.

Among the different types of information that can be conveyed by Bit 6, Bit 6 of the illustrated path overhead byte can be used to indicate one of two mutually exclusive operational states of the link, i.e., whether or not a particular path is connected to an ODIM-compatible device. In addition, this Bit may be used to indicate the beginning of a message superframe, and to further indicate one of three other mutually exclusive states of the link, i.e., whether or not an A link is being transmitted over the link, a B link is being transmitted over the link, or both A and B links are being transmitted over the link.

FIG. 14 is a waveform diagram that illustrates the operation of Bit 6 in a particular implementation. Waveform (a) is a frame pulse, having a period of 125 microseconds. Each of the waveforms (b), (c), and (d) illustrates a different version of Bit 6 as it proceeds through seven cycles of frame pulse (a).

Bit 6 indicates the beginning of a superframe when it does not change for two consecutive cycles of the frame pulse, immediately following several frame cycles of Bit 6 in which the level of Bit 6 changes on each frame cycle. Once this occurs, the beginning of the superframe has been denoted. Thus, with reference to FIG. 14, the superframe starts at frame pulse (2), for each of the (b), (c), and (d) waveforms.

As noted above, Bit 6 can be used to identify whether an A link is present on the enhanced object link, whether a B link is present on the link, or whether both A and B links are present on the link. Bit 6 indicates that an A link is being transported on the enhanced object link when the bit is as shown in waveform (a), i.e., when it is high for two cycles, and is immediately changed to low for two more cycles. Bit 6 indicates that a B link is being transported when the bit is as shown in waveform (b), i.e., when it is low for two frame pulse cycles, followed by two additional low cycles. Both the A and B links are being transported when Bit 6 is as shown in waveform (d), i.e., when Bit 6 remains high for four consecutive frame pulse cycles.

Once Bit 6 goes at least two frame pulse cycles beyond the superframe pulse starting point (which is at frame pulse cycle (2)), if the bit alternates between high and low on the rise of each frame pulse, this indicates that the transmission link is connected to another terminating device which is compatible with the ODIM.

The superframe starting indication of Bit 6 may be used as a timing mechanism for Bits 7 and 4 of the path overhead byte definition.

Bits 0, 1, 2 and 3 are all based on the SONET definitions, as disclosed in ANSI standards document ANSI T1 105-1991, "Digital Hierarchy-Optical Interface Rates and Format Specifications [SONET]," the content of which is expressly incorporated herein by reference, in its entirety.

Bit 7 is used, in conjunction with the superframe starting indication conveyed by Bit 6, to convey information in the form of a message block. FIG. 15 shows a waveform (a) that represents the frame pulse, a waveform (b) that represents Bit 6, and a waveform (c) that represents Bit 7. As shown in waveform (c), Bit 7 transmits a message block by conveying one bit per frame pulse cycle, starting with the frame pulse cycle (1) that occurs after Bit 6 remains unchanged for two consecutive frame pulse cycles. Accordingly, for the case where a superframe comprises 64 frames, the message block can convey up to 64 bits, before the start of a next message block is indicated by another superframe starting indication, by Bit 6. Of course, depending upon the size of the superframe and several other factors, the size and positioning of the message block within a superframe can be changed.

While the invention has been described with reference to several noted embodiments, it is understood that the words which have been used herein are words of description, rather than words of limitation. Changes may be made within the purview of the appended claims, without departing from the scope and spirit of the invention in its aspects. Although the invention has been described herein in reference to particular means, materials, and/or embodiments, it is understood that the invention is not to be limited to the particulars disclosed herein, and that the invention extends to all equivalent structures, methods and uses, such as are within the scope of the appended claims.

What is claimed is:

1. An interface for formatting a first link having N channels to fit into a second link having N+M channels, wherein N and M are both integers, said first link transmitting first information and comprising at least one primary rate carrier link having a payload portion that normally transmits payload information and an overhead portion that normally transmits overhead information, and said second link comprising at least two primary rate carrier links, said interface comprising:
    means for routing the first information to a set of N of the N+M channels of said second link;
    means for adding supplemental overhead information to be transmitted with the first information over said second link; and
    means for routing the supplemental overhead information to at least one added overhead channel chosen from the remaining M channels of said second link, said at least one added overhead channel occupying a payload portion of at least one of the primary rate carrier links of said second link.

2. The interface according to claim 1, wherein said first and second links comprise time division multiplexed links.

3. The interface according to claim 1, wherein said first and second links comprise transmission links that transmit information in the form of a character-interleaved serial digital bit stream.

4. The interface according to claim 1, wherein N is 24 and M is 24, and further wherein said first link comprises a T1 link, and said second link comprises two T1 links.

5. The interface according to claim 1, wherein said at least one added overhead channel comprises an out-of-band channel, which does not comprise payload information.

6. The interface according to claim 1, wherein said supplemental overhead information comprises a path overhead byte having several overhead bits being used to convey overhead parameter information of the second link, and further wherein said means for routing the supplemental overhead information comprises means for processing said path overhead byte.

7. The interface according to claim 6, wherein said several overhead bits comprise several bits used for error and performance monitoring.

8. The interface according to claim 6, wherein said several overhead bits comprise a bit that indicates whether a path far-end bit error has occurred.

9. The interface according to claim 6, wherein said several overhead bits comprise a loopback control bit.

10. The interface according to claim 6, wherein said several overhead bits comprise a general information bit that indicates several parameters of the second link.

11. The interface according to claim 10, wherein said several parameters comprise the position of the beginning of a superframe within the second link.

12. The interface according to claim 6, wherein said several overhead bits comprise a message bit, message bits from several frames forming a message block.

13. The interface according to claim 6, wherein said several overhead bits include a bit for indicating a path remote failure present on the second link.

14. The interface according to claim 1, further comprising:
    means for assigning one memory to be a first link memory and for assigning another memory to be a second link memory;
    means for storing in the first link memory bytes of information received from the first link and bytes of information to be transmitted over the first link;
    means for storing in the second link memory bytes of information received from the second link and bytes of information to be transmitted over the second link; and
    means for placing supplemental overhead information into said second link memory, and for removing supplemental overhead information from said first link memory.

15. An interface for formatting a first link having N channels to fit into a second link having N+M channels, wherein N and M are both integers, said first link transmitting first information, each of the first and second links comprising at least one primary data carrier link having a payload portion that normally transmits payload information and an overhead portion that normally transmits overhead information, said interface comprising:
    means for routing the first information to a set of N of the N+M channels of said second link;
    means for adding supplemental overhead information to be transmitted with the first information over said second link; and
    means for routing the supplemental overhead information to at least one added overhead channel chosen from the remaining M channels of said second link, said at least one added overhead channel occupying a payload portion of at least one primary rate carrier link of said second link;
    wherein said second link comprises means for transmitting a first sub-link and a second sub-link, wherein each of the first and second sub-links comprises a portion of the N channels of said first link, and wherein said interface further comprises means for generating said supplemental overhead information, said supplemental overhead information comprising signalling bits for controlling the routing of each of the first and second sub-links over said second link.

16. The interface according to claim 15, wherein said supplemental overhead information further comprises at least one frame acquisition bit.

17. A system comprising the interface of claim 16, said system comprising said first link, said second link, and a second interface comprising means for transporting each of said first sub-link and said second sub-link over a respective one of two HDSL (High-rate Digital Subscriber Line) twisted pairs.

18. An interface for formatting a first link having N channels to fit into a second link having N+M channels, wherein N and M are both integers, said first link transmitting first information, each of the first and second links comprising at least one primary rate carrier link having a payload portion that normally transmits payload information and an overhead portion that normally transmits overhead information, said interface comprising:
 means for routing the first information to a set of N of the N+M channels of said second link;
 means for adding supplemental overhead information to be transmitted with the first information over said second link; and
 means for routing the supplemental overhead information to at least one added overhead channel chosen from the remaining M channels of said second link, said at least one added overhead channel occupying a payload portion of at least one primary rate carrier link of said second link;
 wherein a portion of said supplemental overhead information is compatible with at least one overhead bit of a SONET link.

19. An interface for formatting a first link having N channels to fit into a second link having N+M channels, wherein N and M are both integers, said first link transmitting first information, each of the first and second links comprising at least one primary rate carrier link having a payload portion that normally transmits payload information and an overhead portion that normally transmits overhead information, said interface comprising:
 means for routing the first information to a set of N of the N+M channels of said second link;
 means for adding supplemental overhead information to be transmitted with the first information over said second link; and
 means for routing the supplemental overhead information to at least one added overhead channel chosen from the remaining M channels of said second link, said at least one added overhead channel occupying a payload portion of at least one primary rate carrier link of said second link;
 wherein said supplemental overhead information comprises a path overhead byte having several overhead bits being used to convey overhead parameter information of the second link, and further wherein said means for routing the supplemental overhead information comprises means for processing said path overhead byte, said several overhead bits comprising a mode switching bit for switching the second link between several signalling modes.

20. The interface according to claim 19, wherein said several signalling modes of the second link comprise a D channel ISDN signalling mode, a POTS signalling mode, and a PCM-30 signalling mode.

21. A method for enhancing a first primary rate carrier link having N channels, comprising:
 emulating the first link with a second link having N+M channels, wherein both N and M are integers, said second link comprising at least two primary rate carrier links that each have a payload portion and an overhead portion for normally transmitting payload and overhead information, respectively; and
 providing at least one supplemental overhead channel within at least one additionally available channel of the second link, said at least one additionally available channel comprising a portion of the payload portion of at least one of the primary rate carrier links of said second link.

22. The method according to claim 21, wherein said first and second links comprise time division multiplexed links.

23. The method according to claim 21, further comprising using said first and second links as transmission links for transmitting information in the form of a character-interleaved serial digital bit stream.

24. The method according to claim 21, wherein N is 24 and M is 24, and further wherein said first link comprises a T1 link, and said second link comprises two T1 links.

25. The method according to claim 21, wherein said supplemental overhead channel comprises a path overhead byte having several overhead bits, said path overhead byte being used to convey overhead parameter information of the second link, said method further comprising processing said path overhead byte.

26. The method according to claim 25, further comprising using said several overhead bits to monitor performance of one or more links.

27. The method according to claims 25, further comprising using at least one of said several overhead bits to indicate whether a path far-end bit error has occurred.

28. The method according to claim 25, wherein said several overhead bits comprise a loopback control bit.

29. The method according to claim 25, further comprising using at least one of said several overhead bits as a mode switching bit to switch the second link between several signalling modes.

30. The method according to claim 29, wherein said several signalling modes of the second link comprise a D channel ISDN signalling mode, and a POTS signalling mode.

31. The method according to claim 25, further comprising using at least one of said several overhead bits as a general information bit to indicate several parameters of the second link.

32. The method according to claim 31, wherein said several parameters comprise the position of the beginning of a superframe within the second link.

33. The method according to claim 31, wherein said several overhead bits comprise a message bit, message bits from several frames forming a message block.

34. The method according to claim 25, further comprising using at least one of said several overhead bits as a bit for indicating a path remote failure present on the second link.

35. A method for enhancing a first primary rate carrier link having N channels, comprising:

emulating the first link with a second link having N+M channels, wherein both N and M are integers; and placing at least one supplemental overhead channel within at least one additionally available channel of the second link;

wherein when said at least one supplemental overhead channel is placed within said at least one available channel of the second link, said supplemental overhead channel is routed to at least one out-of-band channel of a remaining set of M channels of the second link.

36. A method for enhancing a first primary rate carrier link having N channels, comprising:

emulating the first link with a second link having N+M channels, wherein both N and M are integers; and placing at least one supplemental overhead channel within at least one additionally available channel of the second link;

said method further comprising assigning one memory to be a first link memory and assigning another memory to be a second link memory, storing bytes of information received from the first link and bytes of information to be transmitted over the first link into said first link memory, and storing bytes of information received from the second link and bytes of information to be transmitted over the second link into said second memory, said method further comprising placing supplemental overhead information into said second link memory, and removing supplemental overhead information from said first link memory.

37. A method for transmitting information within a communications link that comprises a digital bit stream, the bit stream comprising superframes, frames, channels, and bits, each superframe comprising a predetermined number of frames, each frame comprising a predetermined number of channels, and each channel comprising a predetermined number of bits, said method comprising:

forming an information bit signal with a (k)th bit of an (l)th channel of each frame, wherein l and k are both integers, said information bit signal comprising at least five consecutive (k)th bits; and conveying information regarding the communications link within at most five of the at least five consecutive (k)th bits, said conveying comprising indicating one of several first operational states of the communications link, indicating one of several second operational states of the communications link, and indicating a particular position along the digital bit stream of the communications link.

38. The method according to claim 37, wherein said several first operational states are mutually exclusive, and wherein said several second operational states are mutually exclusive.

39. The method according to claim 37, wherein said several first operational states and said several second operational states collectively comprise five operational states of the communications link.

40. The method according to claim 37, wherein the forming and conveying steps are performed synchronously with a frame pulse that has cycles recurring upon the passage of each frame of the bit stream of the communications link.

41. The method according to claim 37, wherein said indicating steps each comprise determining the level of said information bit signal when the frame pulse changes from a low level to a high level.

42. The method according to claim 37, wherein said particular position comprises the beginning of a superframe along the digital bit stream of the communications link.

43. The method according to claim 37, wherein said second operational states comprise three operational states of the communications link, and depending on which one of the first operational states the communications link is in, the communications link comprises either a first sub-link, a second sub-link, or first and second sub-links, wherein each of the first and second sub-links are a portion of the size of the communications link, and are transmitted within the digital bit stream of the communications link.

44. The method according to claim 37, wherein said first operational states comprise two operational states of the communications link,.and depending on which one of the second operational states the communications link is in, the communications link comprises or does not comprise predetermined overhead bits that render the communications link compatible or incompatible, respectively, with a particular overhead protocol.

* * * * *

UNITED STATES PATENT AND TRADEMARK OFFICE
CERTIFICATE OF CORRECTION

PATENT NO. : 5,452,306
DATED : September 19, 1995
INVENTOR(S) : A. TURUDIC et al.

It is certified that error appears in the above-indentified patent and that said Letters Patent is hereby corrected as shown below:

At column 1, lines 55 and 56, change "(byte) interleaved" to ---(byte)-interleaved---.
At column 7, line 67, change "Within" to ---within---.
At column 21, line 31, change "1" to ---T1---.
At column 24, line 48 (claim 15, line 5), change "data" to ---rate---.
At column 26, line 60 (claim 33, line 1), change "31," to ---25,---.
At column 28, line 40 (claim 44, line 3), change "link,.and" to ---link, and---.

Signed and Sealed this

Ninth Day of July, 1996

Attest:

BRUCE LEHMAN

*Attesting Officer*    *Commissioner of Patents and Trademarks*